(12) United States Patent
Akenine-Moller et al.

(10) Patent No.: US 9,613,394 B2
(45) Date of Patent: Apr. 4, 2017

(54) LOSSY COLOR COMPRESSION USING ADAPTIVE QUANTIZATION

(71) Applicants: Tomas Akenine-Moller, Lund (CH); Jon Hasselgren, Bunkeflostrand (CH); Carl Munkberg, Malmö (CH); Jim Nilsson, Lund (CH); Ariel Berkovits, Yuvalim (IL)

(72) Inventors: Tomas Akenine-Moller, Lund (CH); Jon Hasselgren, Bunkeflostrand (CH); Carl Munkberg, Malmö (CH); Jim Nilsson, Lund (CH); Ariel Berkovits, Yuvalim (IL)

(73) Assignee: INTEL CORPORATION, Santa Clara, CA (US)

( * ) Notice: Subject to any disclaimer, the term of this patent is extended or adjusted under 35 U.S.C. 154(b) by 627 days.

(21) Appl. No.: 14/012,048

(22) Filed: Aug. 28, 2013

(65) Prior Publication Data

US 2015/0062139 A1   Mar. 5, 2015

(51) Int. Cl.
| | | |
|---|---|---|
| G06T 1/60 | (2006.01) | |
| H04N 19/98 | (2014.01) | |
| H04N 19/176 | (2014.01) | |
| H04N 19/15 | (2014.01) | |
| H04N 19/115 | (2014.01) | |
| H04N 19/124 | (2014.01) | |
| H04N 19/186 | (2014.01) | |
| H04N 19/192 | (2014.01) | |

(52) U.S. Cl.
CPC ............ *G06T 1/60* (2013.01); *H04N 19/98* (2014.11); *H04N 19/115* (2014.11); *H04N 19/124* (2014.11); *H04N 19/15* (2014.11); *H04N 19/176* (2014.11); *H04N 19/186* (2014.11); *H04N 19/192* (2014.11)

(58) Field of Classification Search
CPC ........... H04N 19/176; G06K 19/06037; G06K 7/1443
USPC ......................................................... 345/555
See application file for complete search history.

(56) References Cited

U.S. PATENT DOCUMENTS

| | | | | |
|---|---|---|---|---|
| 2006/0083432 A1* | 4/2006 | Malvar | .................... | H04N 1/64 382/232 |
| 2010/0067790 A1* | 3/2010 | Yamamoto | ............. | H04N 1/644 382/166 |
| 2010/0142813 A1* | 6/2010 | Abdo | ..................... | H04N 1/646 382/166 |

FOREIGN PATENT DOCUMENTS

WO    2009/093947 A1    7/2009

OTHER PUBLICATIONS

ATI Technologies Inc., "3Dc™ White Paper" developed by ATI and introduced in the new RADEON. X800 series, 7 Pages.

(Continued)

*Primary Examiner* — Gregory J Tryder
*Assistant Examiner* — Yuehan Wang
(74) *Attorney, Agent, or Firm* — Lynch Law Patent Group, P.C.

(57) ABSTRACT

Techniques related to graphics rendering including techniques for color compression and/or decompression using adaptive quantization are described.

22 Claims, 14 Drawing Sheets

(56) References Cited

OTHER PUBLICATIONS

Rasmusson et al., "Exact and Error-bounded Approximate Color Buffer Compression and Decompression", Graphics Hardware (2007), Copyright c 2007 by the Association for Computing Machinery, Inc., 2007, 9 Pages.

Munkberg, J., et al., "High Dynamic Range Texture Compression for Graphics Hardware," ACM Transactions on Graphics (TOG), ACM, US, vol. 24, No. 3, Jul. 1, 2006.

European Search Report for EP Application No. 14180463.3, mailed Oct. 29, 2014, 9 pages.

* cited by examiner

| Color Value | Y sub-value | Y available | Y EIV | Cg sub-value | Cg available | Cg EIV |
|---|---|---|---|---|---|---|
| cv1 | 32 | 32 | 000 | -32 | -32 | 00 |
| cv2 | 84 | 78 | 010 | -20 | -32 | 00 |
| cv3 | 97 | 101 | 011 | -32 | -32 | 00 |
| cv4 | 106 | 101 | 011 | 26 | 32 | 10 |
| cv5 | 140 | 147 | 101 | 64 | 64 | 11 |
| cv6 | 153 | 147 | 101 | 40 | 32 | 10 |
| cv7 | 162 | 170 | 110 | 64 | 64 | 11 |
| cv8 | 192 | 192 | 111 | 64 | 64 | 11 |

FIG. 7

LOSSY COLOR COMPRESSION USING ADAPTIVE QUANTIZATION

BACKGROUND

In general, graphics rendering may generate an image or images from model data using a wide range of computer implemented techniques. In some implementations, the color buffer may be the largest bandwidth consumer in the graphics pipeline and system performance may be enhanced by color compression techniques.

The aim of such compression techniques, in general, may be to achieve a bit budget. For example, memory bandwidth may be associated with a limit or a specific cache line size or the like that may provide limits (e.g., 512 bits per cache line or the like) for memory transactions. If a compression technique may transmit or store data less than or equal to the limit, the number of transactions associated with the data may be reduced saving power and increasing performance. Therefore, if color data may be compressed to meet the bit budget, the compression may be considered successful and the data may be stored as compressed. If the bit budget is not met, the compression may have failed and the data may be stored uncompressed since the compression would not save on memory transactions or the like. The greater rate at which a compression technique achieves successful compression of data (i.e., meets a desired bit budget), the greater the system performance will be enhanced.

Commonly, color data may be compressed using lossless compression techniques such that the color data is encoded without quality loss. Using lossless techniques may limit attainable compression rates and the rate of successful compressions may be limited. If, however, minor losses of quality are acceptable, greater compression rates may be attained using lossy compression techniques, which may provide more successful attempts at compression and may save memory bandwidth. Such bandwidth savings may increase performance and/or reduce power consumption in various devices.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 7 is an illustrative diagram of example encoded index values corresponding to example color values;

DETAILED DESCRIPTION

Figure 1:
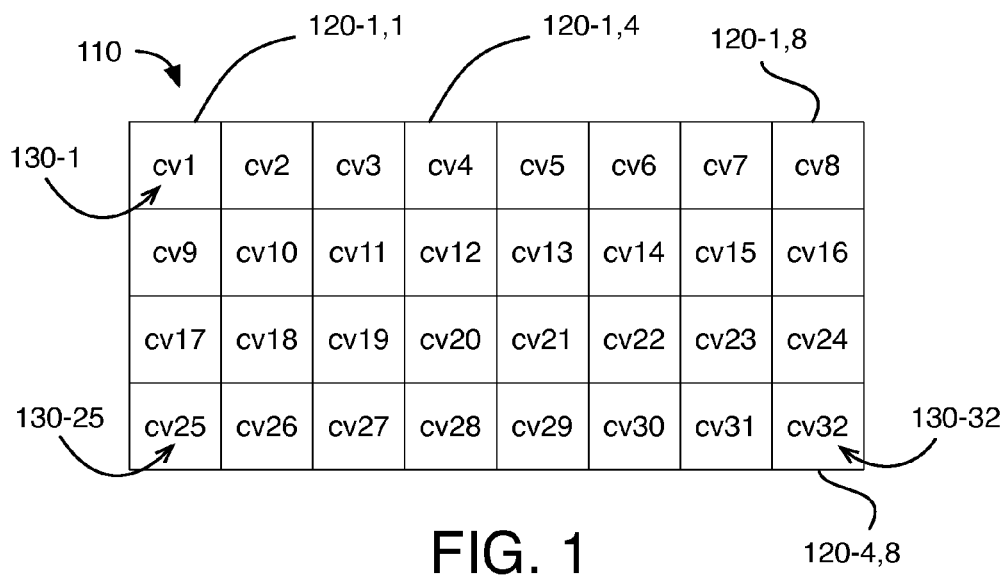
FIG. 1 is an illustrative diagram of an example tile of pixels having associated values.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to graphics rendering including techniques for color compression and/or decompression by use of adaptive quantization.

As described above, it may be advantageous to compress (and decompress) graphics data such as color data. As will be described in greater detail below, in some examples, graphics rendering and compression techniques may operate on tiles. A tile may include any number of individual pixels, such as a rectangular region of W×H pixels, where W is the width of a tile and H is the height of a tile in pixels. For example, a tile may include an 8×4 pixels having 32 pixels or 4×4 pixels having 16 pixels or the like. In some examples, color values may be determined for the pixels such that each pixel has a color value. Furthermore, the color values may each have color sub-values corresponding to color channels. For example, a color may be represented using a red green blue alpha (RGBA) color value with four sub-values corresponding to each of the four color channels (R, G, B, and A). The techniques discussed herein may operate on any color value type represented in any color space. However, in some examples, color values may be mapped to a color space, such as a color space more suitable to compression using the techniques discussed herein. In some examples, color values may be mapped to a pseudo luminance/intensity orange chrominance green chrominance alpha (YCoCgA) color space such that the color values have sub-values corresponding to the four color channels Y, Co, Cg, and A.

In any event, a bounding box may be determined for the color sub-values such that the bounding box comprises one or more bounding ranges for the one or more color channels. The bounding box may include any number of bounding ranges such as, for example, one bounding range for each color channel. In some examples, each bounding range may correspond to a range of values from a minimum sub-value for the color channel to a maximum sub-value for the color channel. In some examples, the bounding ranges may be quantized to generate sets of available values. For example, depending on a size (e.g., a "width") of the bounding range, a number of available values within the range may be determined In some examples, the number of available values may be a factor of 2, such that available values may be encoded. If a bounding range only has one value, for example, no quantization is needed. In other examples, 2, 4, 8, 16, or 32, or the like number of available values may be made available depending on bandwidth constraints as is discussed further herein. In some examples, a bounding range may be fully describable using the quantization. For example, if the range includes 8 values, 8 available values may fully describe the bounding range. However, often, the number of available values will be less than the width of the bounding range and subsequent encoding of the color sub-values may be a lossy encoding such that data is lost in the codec described herein. In some examples, the width may be set at an actual width of the bounding range. In some examples, the number of available values may be no greater than a limit such as 32 or the like.

In some examples, the available values of the quantized bounding range may be associated with index values. In some examples, k-bit index values may be needed to be associated with a quantized bounding ranges quantized with $2^k$ index values. For example, 8 index values may be encoded with 3-bit index values, 16 index values may be encoded with 4-bit index values, and so on. In some examples, the color sub-values may be encoded by associating the color sub-value with an index value corresponding to an available value closest to the actual color sub-value. Such encoding may be performed for some or all of the color channels to generate encoded index values that encode the sub-values. In some examples, graphics data including the encoded index values and data associated with the bounding box (e.g., data to describe the bounding range(s) of the bounding box) may be stored in memory.

As is discussed in greater detail below, in general, some compression techniques may achieve a desired bit budget. For example, memory bandwidth may be associated with a limit or a cache line or the like which may provide limits (e.g., 512 bits or the like) for memory transactions. If a compression technique may transmit or store data less than the limit, the number of transactions associated with the data may be reduced saving power and increasing performance. If the compression succeeded, the graphics data as described may be stored. Alternatively, if the compression failed, the graphics data may be further compressed by shaving or reducing the number of bits used to quantize and encode the bounding range. For example, bits may be removed one-by-one from the channels in an order (e.g., in the order of A, Cg, Co, Y in the YCoCgA example) until a bit budget is met. For example, if a bit is removed from the quantization of the A channel bounding range, the range may go from being represented by 128 available values to 64 available values or the like. Subsequently, the bounding range may be re-quantized to determine a reduced set of available values, the reduced set of available values may be associated with index values, and the sub-values corresponding to the A channel may be re-encoded. The number of bits in the now reduced graphics data may be compared to the bit budget and if it succeeds, the data may be stored. If it fails, the bit shaving or reducing may continue until the bit budget is achieved. For example, a single bit may be iteratively removed from the Cg channel, the Co channel, and then the Y channel, then a second bit may be iteratively removed from the A channel, the Cg channel, the Co channel, and then the Y channel, and so on until the bit budget is achieved. In other examples, such an iterative technique may be replaced by a technique that determines a number of bits that need to be shaved or removed to meet the budget and the described techniques may be applied using the reduced bounding ranges. In such techniques a minimum bit budget may be used such that the color data may not use less than certain bit widths (for example, 3 bits and 8 available values or 4 bits and 16 available values or the like). Ultimately, if the bit budget is not met based on such minimum threshold limits, the compression may have failed and the color values may be stored uncompressed using standard techniques.

In some examples, the data encoded using such techniques may be read from memory and decoded. For example, graphics data including the described encoded index values and data associated with the bounding box (e.g., data to in some manner describe the one or more boundary ranges such as maximum and minimum values in the range) may be accessed. The graphics data may also include width(s) of the boundary range(s). In some examples, available values may be determined based on the data associated with the bounding box and the width(s). In some examples, decoded color values for the pixels may be determined based on the determined available values and the encoded index values. In some examples, the decoded color values may be lossy with respect to the (original) color values prior to compression.

As will be discussed in greater detail below, in some examples, a system may determine color data (e.g., via rendering to a tile and/or accessing color data associated with the tile), compress the color data using the techniques discussed herein, and store the resulting graphics data (e.g. encoded index values and data associated with a bounding box) in memory. The system may also, in some examples, access the graphics data and determine decoded color values for a tile based on the accessed graphics data. In some examples, the decoded color values may be lossy with respect to the original determined color values. The following discussion may use such a system and techniques for exemplary purposes. In other examples, a system may receive compressed graphics data (e.g. encoded index values and data associated with a bounding box) from another system or source. In such examples, the system may determine decoded color values based on the received graphics data using the techniques discussed herein. Such a system may be implemented via software, a processor, or device as discussed herein. Further, in some examples, a system may compress color data and transmit the resulting graphics data (e.g. encoded index values and data associated with a bounding box) for use by another system or systems.

As discussed, compressing color values for multiple pixels, such as, for example, a tile of pixels may save significant bandwidth while transferring or storing graphics data in various computer implementations. Such bandwidth savings may increase performance and/or reduce power consumption in various devices.

FIG. 1 is an illustrative diagram of an example tile 110 of pixels 120 having associated color values 130 (illustrated as color values cv1-cv32), arranged in accordance with at least some implementations of the present disclosure. As shown, tile 110 may include multiple pixels 120-1,1-120-4,8. Tile 110 may include any number of pixels. In some examples, tile 110 may be 8 pixels wide by 4 pixels high (and may therefore include 32 pixels, as shown). Also as shown, individual pixels 120-1,1-120-4,8 may have or include an associated color value 130. Color values 130 may include any suitable color data such as graphics data or rendering data or the like. As is discussed herein, color values 130 may include color data represented using any color model or color space or the like and color values 130 each may include multiple color sub-values.

Figure 2:
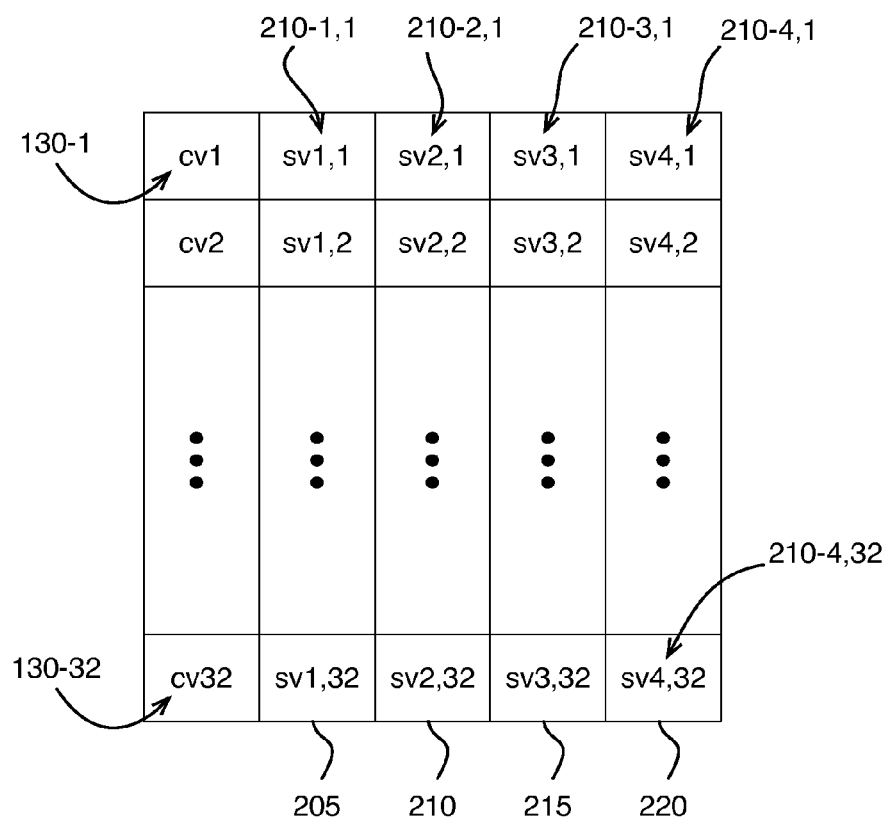
FIG. 2 is an illustrative diagram of example color sub-values of color values arranged to align color channels.

FIG. 2 is an illustrative diagram of example color sub-values 210 of color values 130 arranged to align color channels 220, arranged in accordance with at least some implementations of the present disclosure. As shown, color values 130 may each include multiple color sub-values 210 (illustrated as sv1,1-sv1,32, sv2,1-sv2,32, sv3,1-sv3,32, and sv4,1-sv4,32) such that the sub-values correspond to multiple color channels 220-1, 220-2, 220-3, and 220-4. For example, color value 130-1 (i.e., cv1) may include sub values 210-1,1, 210-2,1, 210-3,1, and 210-4,1. (i.e., sv1,1, sv2,1, sv3,1, and sv4,1). As shown, each sub-value 210 may be associated with a color channel 220. For example, sub-values 210-1,1 to 210-1,32 may be associated with a first color channel 220-1, sub-values 210-2,1 to 210-2,32 may be associated with a second color channel 220-2, and so on. In some examples, color channels 220 may be color channels associated with a color space or color model or the like. For example, color channels 220 may be associated with a red green blue alpha (RGBA) color space such that color channel 220-1 includes red values for color values 130, color channel 220-2 includes green values for color values 130, color channel 220-3 includes blue values for color values 130, and color channel 220-4 includes alpha values for color values 130.

Color values 130 may be represented using any suitable number or type of color channels 230. As discussed, in some examples, color values 130 may include red green blue alpha (RGBA) color values. In other examples, color values 130 may include a subset of RGBA values such as 8-bit red green blue alpha (R8G8B8A8) color values, 16-bit red green blue alpha (R16G16B16A16) color values, pseudo luminance/intensity orange chrominance green chrominance alpha (YCoCgA) color values, or the like. In such examples, color channels 220 may correspond to the described color components. For example, in a YCoCgA color space, color channels 220 may include a Y color channel 220-1, a Co color channel 220-2, a Cg color channel 220-3, and an A color channel 220-4. As shown in FIG. 2, color values 130 may each include four color sub-values 210. In other examples, color values 130 may include two, three, or five color sub-value, or the like.

Color values 130 may be determined or generated using any suitable technique or techniques such as for example, reading from memory, rendering graphics data, or the like. Furthermore, the techniques discussed herein may operate on color values 130 represented using any color space. In some examples, it may be advantageous to map from a color space to a color space more suitable for the described compression techniques. For example, RGBA color data may be mapped to YCoCgA color data prior to performing the described compression, as is discussed further herein with respect to FIG. 10. In some examples, determining color values 130 may include mapping from one color space to another color space.

Figure 3:
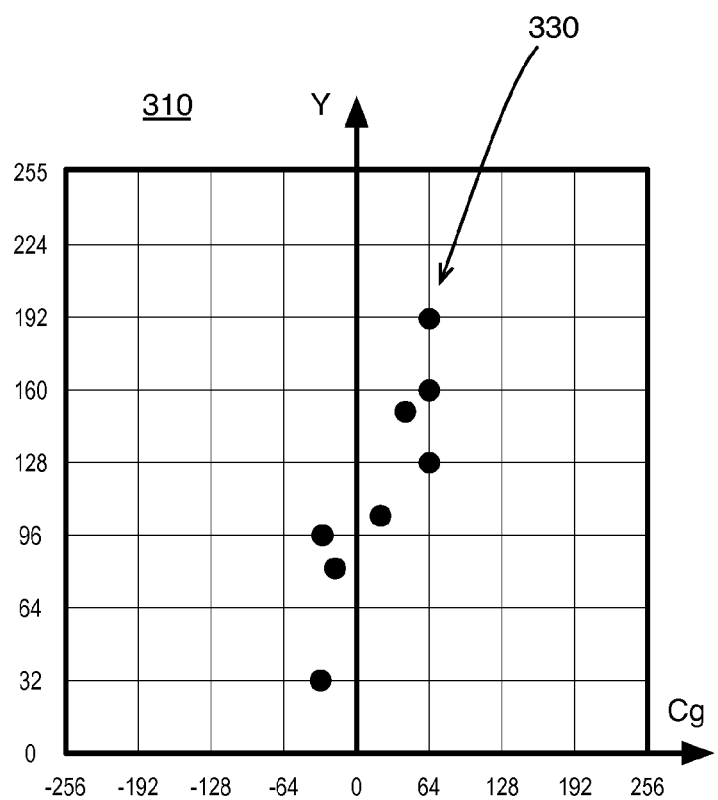
FIG. 3 is an illustrative diagram of example color values diagrammed on an example portion of a color space.

Turning now to FIG. 3, FIG. 3 is an illustrative diagram of example color values 330 diagrammed on an example portion of a color space 310, arranged in accordance with at least some implementations of the present disclosure. For example, color space 310 may include a YCoCgA color space as discussed and color values 330 may be represented via color space 310. Although illustrated with respect to the color space YCoCgA color space, the embodiments discussed herein may be applied to any suitable color space. As shown, color space 310 may include a Y component and a Cg component. In the illustrated example, the Co component and the A component are not shown for the sake of clarity of presentation. Also, in general, color values 330 may include any number of color values 330 such as 32 color values as described with respect to FIGS. 1 and 2. In the illustrated example, 8 color values are shown for the sake of clarity of presentation. As illustrated in FIG. 3 and illustrated further with respect to FIG. 10, the YCoCgA color space may be advantageous for the techniques described herein because color values 330 for many scenes or tiles of scenes including natural scenes or tiles and scenes or tiles including people may be bunched substantially close together. As shown, color values 330 may be illustrated with respect to color sub-values associated with a Y color channel and Cg color channel in FIG. 3.

Figure 4:
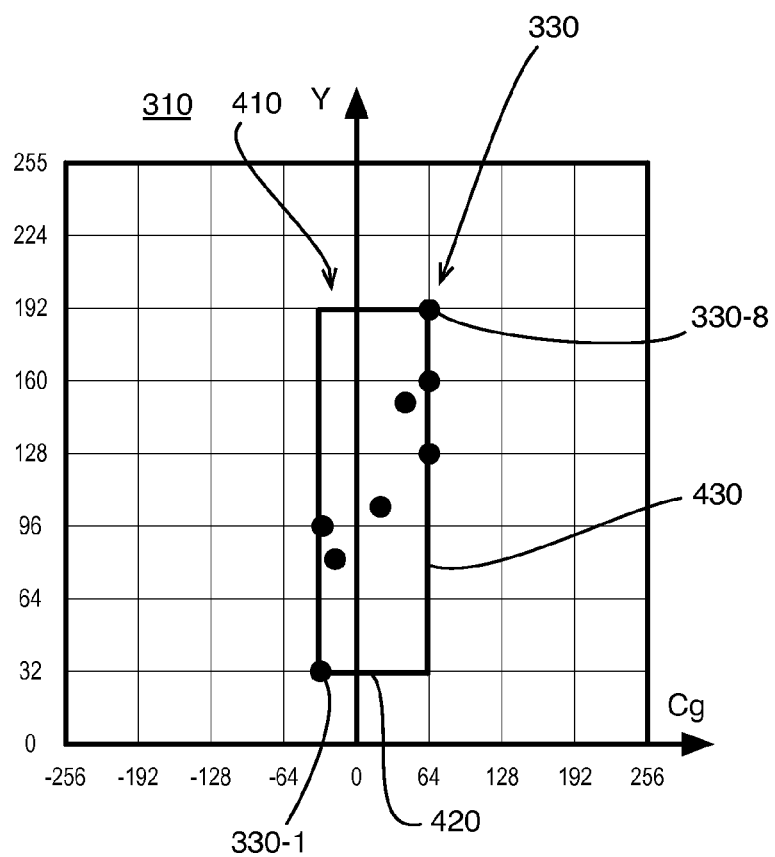
FIG. 4 is an illustrative diagram of an example bounding box for sub-values associated with color values.

Turning now to FIG. 4, FIG. 4 is an illustrative diagram of an example bounding box 410 for sub-values associated with color values 330, arranged in accordance with at least some implementations of the present disclosure. As shown, bounding box 410 may include bounding range 420 and bounding range 430. Bounding range 420 may be associated with the Cg color channel (and the sub-values corresponding to the Cg color channel) and bounding range 430 may be associated with the Y color channel (and the sub-values corresponding to the Y color channel). Furthermore, in some examples, although not illustrated for the sake of clarity, bounding box 410 may include a bounding range associated with the Co color channel (and the sub-values corresponding to the Co color channel) and a bounding range associated with the A color channel (and the sub-values corresponding to the A color channel). In some examples, bounding ranges 420 and 430 of bounding box may extend from a minimum sub-value to a maximum sub-value for the associated color range. For example, bounding range 430 may extend from about 32 (the Y sub-value associated with color value 330-1) to about 192 (the Y sub-value associated with color value 330-8) and bounding range 420 may extend from about −32 (the Cg sub-value associated with color value 330-1) to about 64 (the Cg sub-value associated with color value 330-8). Also, as shown, each of color values 330 is within bounding box 410. Bounding box 410 (and the associated bounding ranges) may be determined using any suitable technique or techniques such as, for example, determining a minimum and maximum sub-values for individual color channels.

Figure 5:
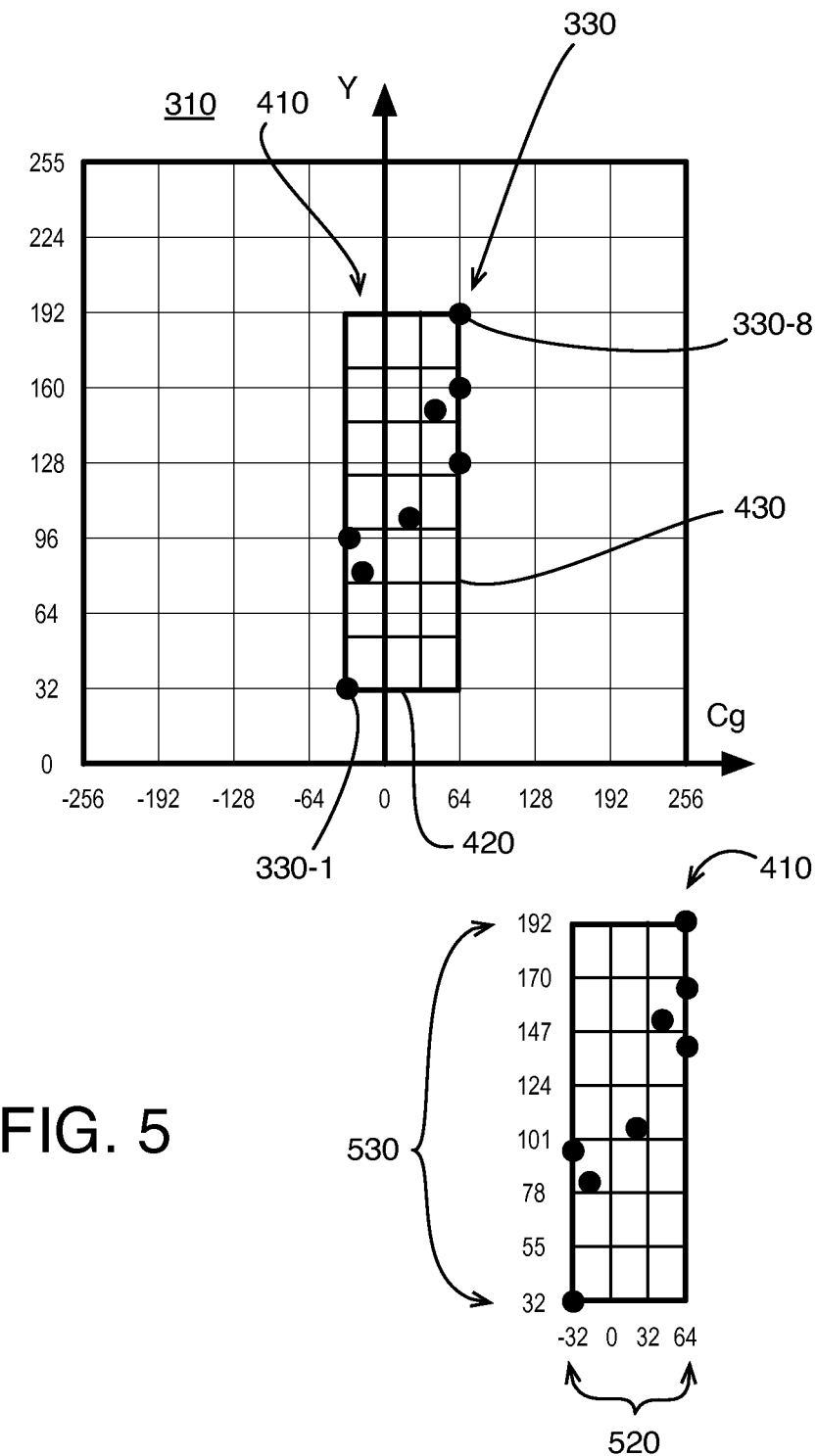
FIG. 5 is an illustrative diagram of an example quantization of a bounding box.

Turning now to FIG. 5, FIG. 5 is an illustrative diagram of an example quantization of bounding box 410, arranged in accordance with at least some implementations of the present disclosure. As shown, bounding range 420 and bounding range 430 of bounding box 410 may be quantized to generate a set of available values 520 for bounding range 420 (and the associated sub-values of the color channel of boundary range 420) and a set of available values 530 for bounding range 430 (and the associated sub-values of the color channel of boundary range 420). In FIG. 5, bounding box 410 is illustrated twice: once diagrammed on color space 310 and repeated outside of color space 310 for the sake of clarity of presentation. Bounding box 410 may have any number of bounding ranges, as discussed herein.

In the illustrated example, available values 530 may include 8 available values and available values 520 may include 4 available values. The available values may include any number of available values (up to the number of values needed to describe the bounding range). In some examples, the number available values may be $2^k$ such that the available values may be indexed using a k-bit index value as is discussed further herein. In some examples, a bit width may be set for each boundary range. In some example, the bit width may be a number of bits needed to represent the boundary range. In the illustrated example, boundary range 530 may have a minimum value of 32 and a maximum value of 192, such that the size of boundary range 530 is 160 (e.g., rangeY=max (Yi)−min (Yi)=192−32=160), where i is a counter variable for each of the sub-values in the Y channel). In order to fully represent a bounding range of 160, 161 available values may need to be available, for example. To index and/or encode 161 values, a bit width of $2^k>161$ may be needed such that the required bit width to fully describe the 161 values may be k=8 (giving $2^k=256$, please note k=7 provides 128 available values).

In some examples, the bit width for each boundary range may be an important factor in the compression process discussed herein. For example, a lower bit width may provide for greater compression but fewer available values and therefore more data loss in compression. Higher bit widths may provide for less data loss in compression but a lower compression rate. In some examples, the bit width may be the minimum number of bits needed to provide for all of the available values. In some examples, a limit may be placed on the bit width or the bit width may provide for fewer than all of the available values as is discussed herein. As used herein "bit width" may be any such width for a boundary range. As is discussed further herein, in some examples, a bit width may start (e.g., at a first iteration) at a value needed to provide for all of the available values in a boundary range or a maximum value and, in subsequent iterations, the bit width may be reduced by one or more bits (e.g., one at a time in multiple iterations) to a reduced bit width or just "bit width" that may provide for fewer than all of the available values as described. In such examples, the bit width of one or more boundary ranges may be reduced until graphics data representing color values 130 may meet a bit budget as discussed further herein. In some examples, bit widths that do not provide for encoding of all of the available values in a boundary range may provide "lossy" encoding or compression techniques. Furthermore, in some examples, for one or more color channels, color values 330 may contain only a single value. In such cases, no bits may be stored for the channel, as is described further herein below.

In some examples, a bit width may be determined using the following code:

```
1    UINT Width(UINT range)
2    {
3        for (UINT w = 0; w < 32; ++w) {
4            if ((range >> w) == 0) return (w);
5        }
6        return 32;
7    }
``` where Width may the number of bits needed to represent range, which may be a size of a bounding range. It is noted that the provided code is exemplary. There may be simpler and more efficient ways to implement the determination of bit width in hardware, for example.

As discussed, in some examples, the bit width associated with available values 530 and/or the bit width associated with available values 520 may be determined by iteratively reducing bits to meet a bit budget. In other examples, the associated bit widths may be determined based on the size of the associated boundary range, the relative importance of a color channel, a maximum bit width value, a predetermined bit width value, or the like. Also as discussed, the available values may be all of the values in a particular bounding range or a subset of all of the values in a particular bounding range. As will be appreciated, available values 530 and 520 and their associated bit widths are for illustrative purposes and are not meant to be limiting.

Figure 6:
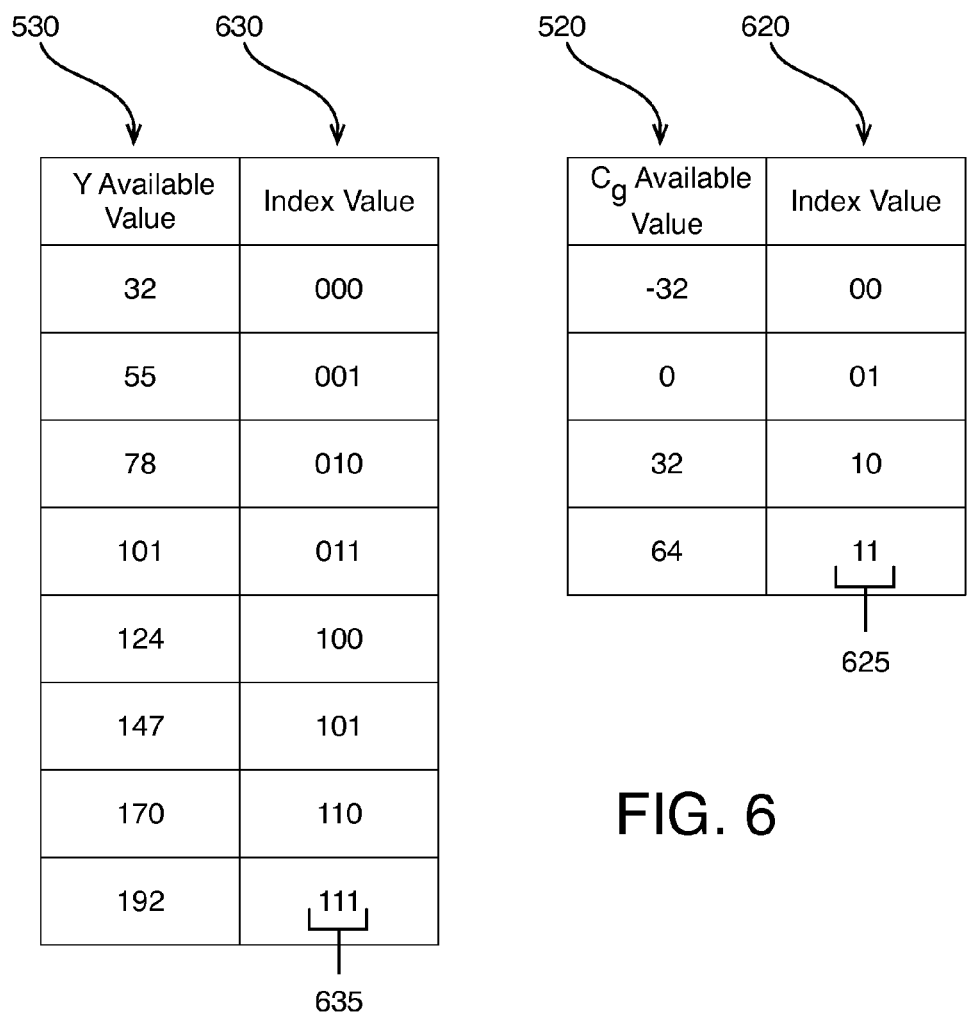
FIG. 6 is an illustrative diagram of example index values associated with example available values.

Turning now to FIG. 6, FIG. 6 is an illustrative diagram of example index values 630, 620 associated with example available values 530, 520, arranged in accordance with at least some implementations of the present disclosure. As shown, available values 530 (i.e., the set of available values for the Y channel) may be associated with index values 630 (i.e., the set of index values for the Y channel). Also as shown in FIG. 6, index values 630 may have a bit width 635 of 3 bits such that $2^3=8$ available values 530 may be indexed for the Y channel and index values 620 may have a bit width 625 of 2 bits such that $2^2=4$ available values 530 may be indexed for the Y channel. Available values 530 and 520 may be associated with index values 630 and 620, respectively, using any suitable technique or techniques. As shown, in some examples, the index values may be applied in an increasing order to the associated available values.

Turning now to FIG. 7, FIG. 7 is an illustrative diagram of example encoded index values 728 and 738 corresponding to color values 330, arranged in accordance with at least some implementations of the present disclosure. As shown, color values 330 (illustrated as cv1-8) may have associated Y channel sub-values 730 (e.g., "actual" Y channel sub-values). In some examples, each Y channel sub value 730 may be associated with a quantized Y channel available value 735, as shown. For example, referring to FIG. 5, color value 330-1 may have a Y channel sub-value of 32, which is illustrated in FIG. 7 as Y channel sub-value 730-1. Y channel sub-value 730-1 may be associated Y channel available value 735-1, which in this example, may be the same value. In some examples, Y channel sub-values 730 may be associated with the closest Y channel available value 530 (please refer to FIG. 6). Furthermore, Y channel sub-value 730 of color value 330-1 may be encoded by associating Y channel sub-value 735-1 with encoded index value (EIN as illustrated) 738-1 (please refer also to FIG. 6). Similarly, the Y channel sub values 730-2 through 730-8 of color values 330-2 through 330-8 may be similarly associated with a closest of Y channel available values 530 to determine Y channel available values 735-2 through 735-8. As shown, in some examples, the Y channel available value 735 may be different than the Y channel sub-value 730, which indicates a loss of information and therefore lossy compression. Y channel sub-values 730-2 through 730-8 may be encoded with encoded index values 738-2 through 738-8 by associating Y channel sub-values 730-2 through 730-8 with the encoded index value corresponding to Y channel available values 735-2 through 735-8, via the set of index values 630, as shown in FIG. 6.

Similarly, Cg channel sub values 720 may be associated with a quantized Cg channel available values 725, as shown. For example, referring to FIG. 5, color value 330-1 may have a Cg channel sub-value of −32, which is illustrated in FIG. 7 as Cg channel sub-value 720-1. Cg channel sub-value 720-1 may be associated Cg channel available value 725-1, which in this example, may be the same value. In some examples, Cg channel sub-values 720 may be associated with the closest Cg channel available value 520 (please refer to FIG. 6) as discussed herein. Furthermore, Cg channel sub-value 720 of color value 330-1 may be encoded by associating Cg channel sub-value 725-1 with encoded index value 728-1 (please refer also to FIG. 6). Similarly, the Cg channel sub values 720-2 through 720-8 of color values 330-2 through 330-8 may be similarly associated with a closest of Cg channel available values 520 to determine Cg channel available values 725-2 through 725-8. As discussed, in some examples, the Cg channel available value 725 may be different than the Cg channel sub-value 730. Cg channel sub-values 720-2 through 720-8 may be encoded with encoded index values 728-2 through 728-8 by associating Cg channel sub-values 720-2 through 720-8 with the encoded index value corresponding to Cg channel available values 725-2 through 725-8, via the set of index values 620, as shown in FIG. 6.

Furthermore, any number of color channels may be encoded using the described techniques. For example, in the YCoCgA color space, Co and A encodings may be performed for color values 330. In some examples, each color channel may be encoded or compressed as described. In other examples, one or several but not all of the color channels may be encoded or compressed. For example, bounding box 410 may include one, two, three, or four, or the like bounding ranges. The bounding range(s) may be quantized with a number of available values that may be indexed with index values having an associated bit width (e.g., there may be $2^k$ available values for a bit width of k bits).

In some examples, encoded index values 728, 738 may save substantial memory bandwidth in comparison with the associated sub-values 720, 730. As discussed, the aim of the discussed compression techniques may be to meet a desired bit budget. For example, memory bandwidth may be associated with a limit or a cache line or the like which may provide limits (e.g., 512 bits or the like) for memory transactions such that the bit budget may be 512 bits. In other examples, the bit budget may be associated with tile 110 (please refer to FIG. 1) such that the data associated with tile 110 may need to be compressed by 50% or the like and the bit budget may half the number of bits allocated to tile 110 of pixels 120, or the like. For example, the discussed techniques may apply a 2:1 compression ratio.

In some examples, if graphics data including the encoded index values and data associated with the bounding box meets the desired bit budget, the graphics data may be stored using the described compression techniques. If the desired bit budget is not met, the graphics data may be stored uncompressed or the graphics data may be further compressed to meet the bit budget as discussed herein. Ultimately, if the bit budget is not met (despite the further compression efforts), the compression may have failed and the color values may be stored uncompressed using standard techniques.

Figure 8:
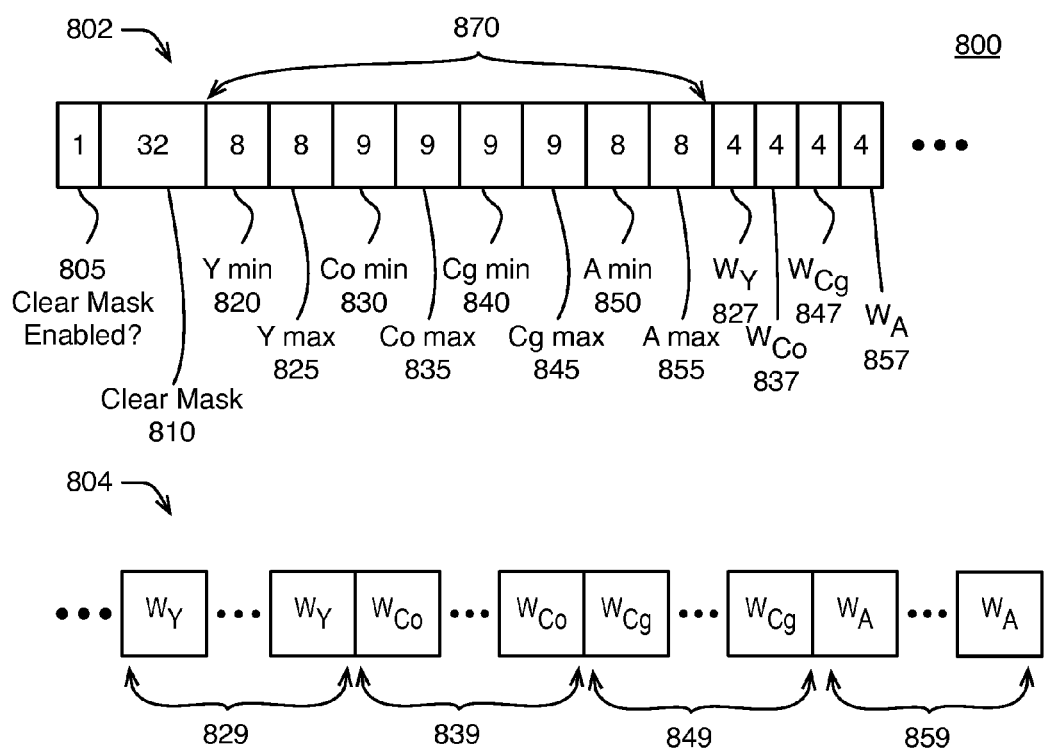
FIG. 8 is an illustrative diagram of example compressed graphics data.

FIG. 8 is an illustrative diagram of example compressed graphics data 800, arranged in accordance with at least some implementations of the present disclosure. As shown in FIG. 8, graphics data 800 may include a header portion 802 and a data portion 804. In some examples, header portion 802 may include a clear mask bit 805 (of 1 bit as shown) to indicate whether a clear mask is enabled and/or an optional clear mask 810 (if clear mask enabled bit 805 is enabled). Clear mask techniques are known in the art and will not be described in any greater detail. It is important to note that if a clear mask technique is used and if clear mask bit 805 is enabled, optional clear mask 810 may use a portion of any available bit budget.

As shown, header portion 802 may also include Y min 820 (8 bits), Y max 825 (8 bits), Co min 830 (9 bits), Co max 835 (9 bits), Cg min 840 (9 bits), Cg max 845 (9 bits), A min 850 (8 bits), and A max 855 (8 bits), which may provide bounding box data 870. For example, given the illustrated maximum and minimum values, the bounding ranges may be determined such that the described bounding ranges extend from the associated minimum value to the associated maximum value, for example. Although illustrated with respect to YCoCgA color data to continue the above illustrated example, graphics data 800 may include any color data. Also as shown, header portion 802 may include Y width (illustrated as W) 827, Co width 837, Cg width 847, and A width 857, which may provide a bit width for the associated color channels, bounding ranges, and/or encoded index values as discussed herein.

Also as shown in FIG. 8, graphics data 800 may include data portion 804 including Y color channel encoded index values 829 (having a bit width of $W_Y$), Co color channel encoded index values 839 (having a bit width of $W_{Co}$), Cg color channel encoded index values 849 (having a bit width of $W_{Cg}$), and A color channel encoded index values 859 (having a bit width of $W_A$). In some examples, the encoded index values may correspond to encoded index values 728, 738 as discussed above (e.g., Y color channel encoded index values 829 may include encoded index values 728 and Cg color channel encoded index values 849 may include encoded index values 738). As discussed herein, if a channel has no width (i.e., all of the sub-values are the same for a channel either before or after compression), no data may be stored for that channel in data portion 804. For example, if all of the sub-values for the A channel are the same, no data may be stored such that A color channel encoded index values 859 may be removed from data portion 804 of graphics data 800.

As will be discussed in greater detail below, a system, such as a computer-implemented system may be used to perform some or all of the various operations discussed herein with respect to FIGS. 1-8 and elsewhere herein.

Figure 9:
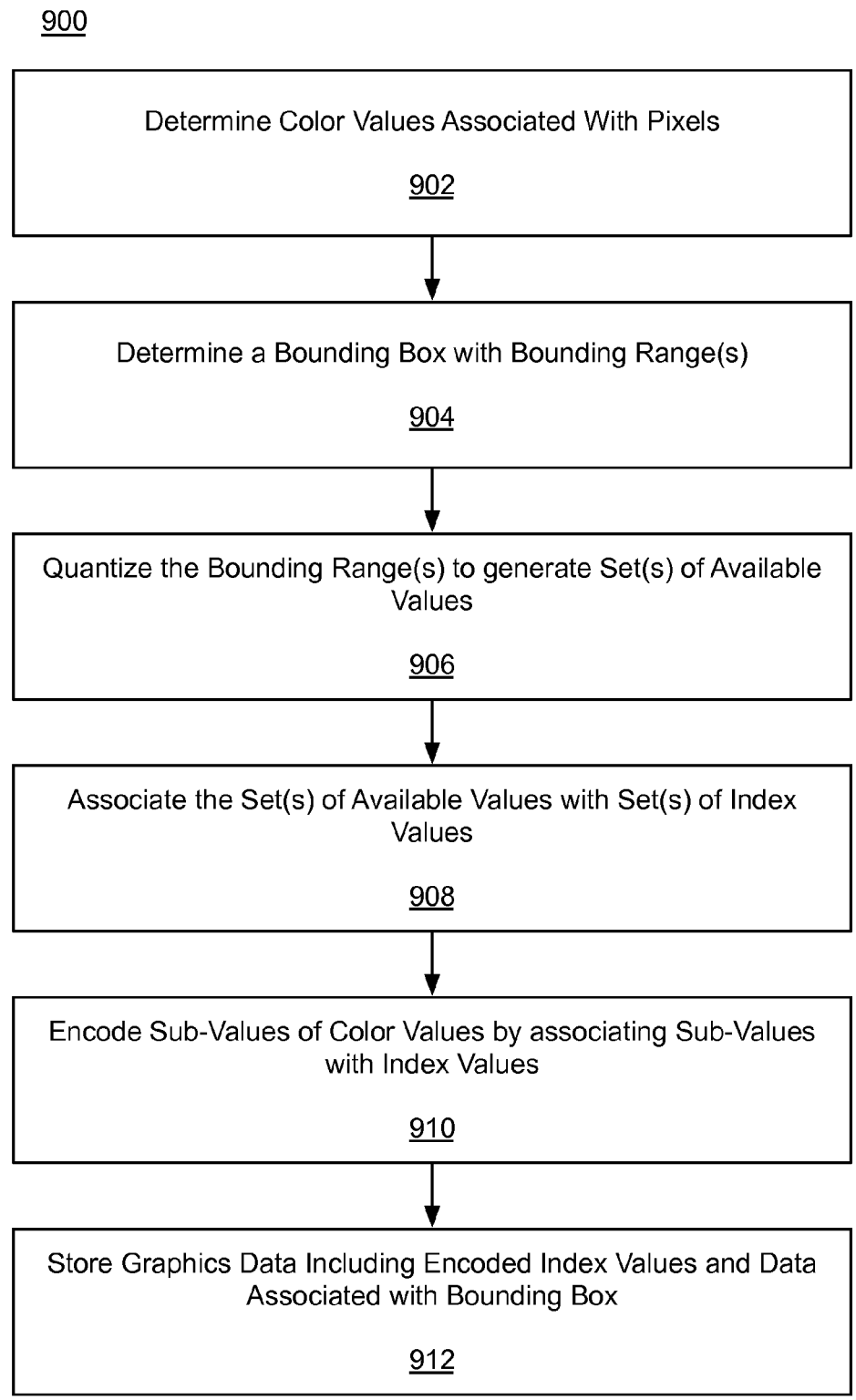
FIG. 9 is a flow chart illustrating an example process.

FIG. 9 is a flow chart illustrating an example process 900, arranged in accordance with at least some implementations of the present disclosure. In some examples, process 900 may provide a computer-implemented method for providing compression in graphics rendering. In the illustrated implementation, process 900 may include one or more operations, functions or actions as illustrated by one or more of operations 902, 904, 906, 908, 910, and/or 912. By way of non-limiting example, process 900 will be described herein with reference to operations discussed with respect to FIGS. 1-8 above and example system 100 discussed below.

Process 900 may be utilized as a computer-implemented method for providing compression in graphics rendering. Process 900 may begin at operation 902, "Determine Color Values Associated With Pixels", where a plurality of color values associated with pixels (e.g., of a tile of pixels) may be determined. For example, color values cv1-cv32 of tile 110 may be determined. As discussed above, the color values may have sub-values corresponding to the color channels of a color space. The color values may be determined by any suitable technique such as, for example, various rendering techniques. In other examples, determining the plurality of color values may include accessing graphics data (e.g., via a cache or buffer or the like) associated with the tile of pixels. For example, the graphics data may include the plurality of color values. Such accessing of graphics data may occur on a cache evict for example.

In other examples, determining the color values may include mapping from one color space to another color space. For example, color values may be mapped to a color space more suitable to compression using the techniques discussed herein.

Figure 10:
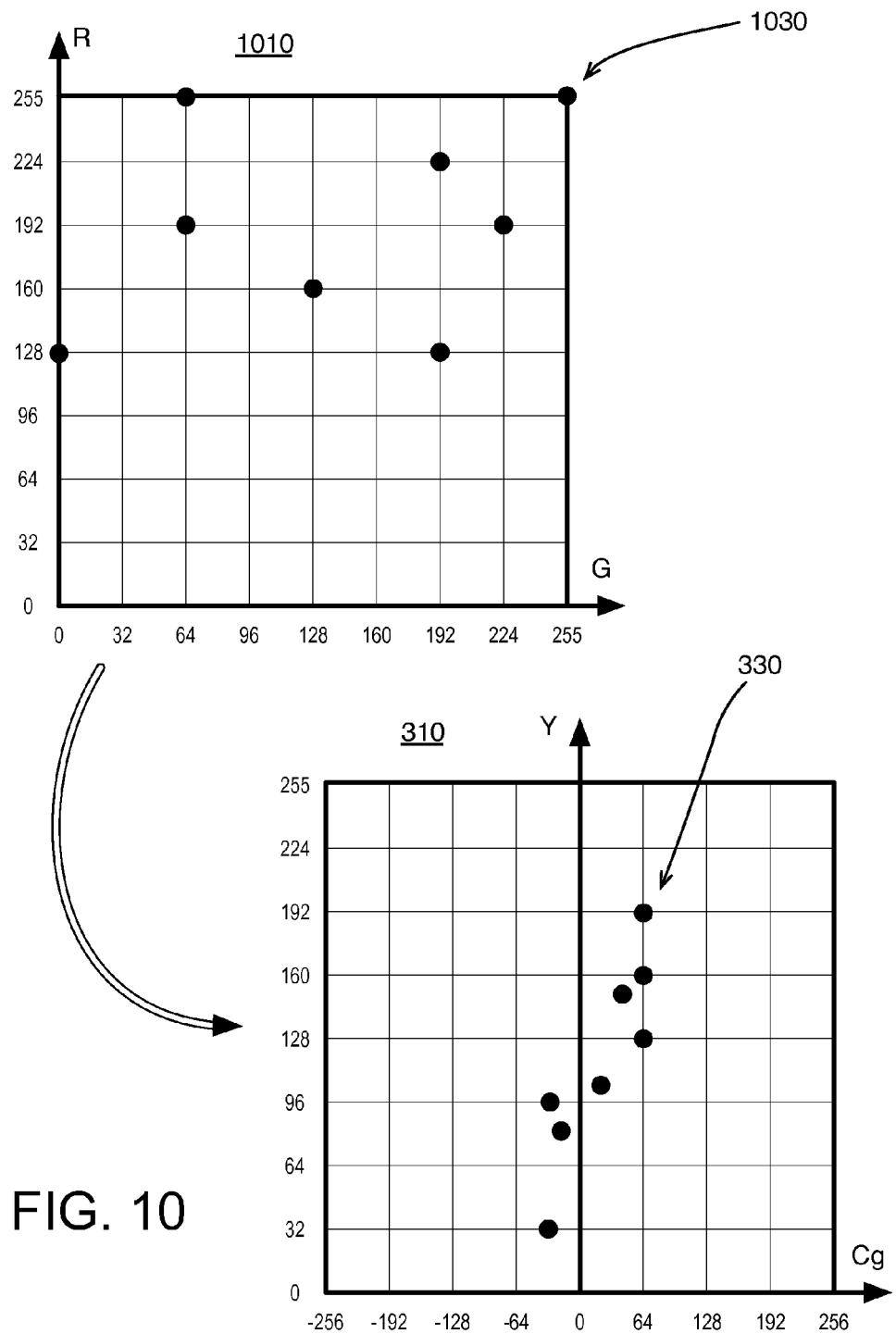
FIG. 10 illustrates an example mapping from a first color space to a second color space.

For example, turning briefly to FIG. 10, FIG. 10 illustrates an example mapping from a first color space to a second color space, arranged in accordance with at least some implementations of the present disclosure. As shown in FIG. 10, color values 1030 in color space 1010 may be mapped to color values 330 in color space 310. In the illustrated example, color space 1010 may be a red green blue alpha (RGBA) color space and wherein color space 310 may be a pseudo luminance/intensity orange chrominance green chrominance alpha (YCoCgA) color space as discussed herein. For the sake of illustration, two color channels of the color spaces are illustrated for the sake of clarity of presentation; however, the mapping between color spaces may map all of the color channels. As shown in FIG. 10, mapping to a color space may be advantageous for the compression techniques discussed herein as color values 310 may be more closely bunched than color values 1010. As discussed above, the YCoCgA color space may be advantageous for the techniques described herein because color values 330 for many scenes or tiles of scenes including natural scenes or tiles and scenes or tiles including people may be bunched substantially close together.

Referring back to FIG. 9, processing may continue from operation 902 to operation 904, "Determine a Bounding Box with Bounding Range(s)", where a bounding box having one or more bounding ranges may be determined for the sub-value of the color values. For example, bounding box 410 may be determined as discussed herein. The bounding box may have any number of bounding ranges. In some examples, each color channel may be compressed using a bounding range. In other example, only one or some of the color channels may be compressed using bounding range(s) and other color channels may remain uncompressed.

Processing may continue from operation 904 to operation 906, "Quantize the Bounding Range(s) to generate Set(s) of Available Values", where the one or more bounding ranges may be quantized to generate one or more sets of available values. For example, bounding ranges 420 and 430 may be quantized to generate corresponding available values 520 and 530 as discussed herein. In some examples, prior to quantizing the one or more bounding ranges, one or more corresponding bit widths may be set, as discussed herein. In some examples, setting the bit widths may include attempting to meet a bit budget. In some examples, setting the bit widths may include an iterative process of removing bits from graphics data to meet a bit budget.

Processing may continue from operation 906 to operation 908, "Associate the Set(s) of Available Values with Set(s) of Index Values", where the one or more sets of available values may be associated with one or more sets of index values. For example, available values 520 and 530 may be associated with index values 620 and 630, as discussed herein. In some examples, the bit width, the number of available values and the number of index values may be the same for a color channel.

Processing may continue from operation 908 to operation 910, "Encode Sub-Values of Color Values by associating Sub-Values with Index Values", where the sub-values corresponding to the one or more color channels may be encoded by associating the sub-values with an encoded index value from the corresponding set of index values. For example, sub-values 720 and 730 may be encoded by associating sub-values 720 and 730 with index values 620 and 630 (respectively) to generate encoded index values 728 and 738. Such association of sub-values 720 and 730 may include determining a closest available value 725 and 735 for each of the sub values 720 and 730 and determining an index value 620 and 630 associated with the closest available value 725 and 735, as discussed herein.

Processing may continue from operation 910 to operation 912, "Store Graphics Data Including Encoded Index Values and Data Associated with Bounding Box", where graphics data including the encoded index values and data associated with the bounding box may be stored. For example, the graphics data may be stored in a memory. In some examples the graphics data may include graphics data 800 (not illustrated, see, e.g., FIG. 8). As discussed, in some examples, the graphics data may be stored in compressed format only if it meets a bit budget. In such examples, the number of bits for the graphics data may be compared with the bit budget. If the number of bits for the graphics data is less than or equal to the bit budget, the graphics data may be stored. If the number of bits for the graphics data is greater than the bit budget, other graphics data including the plurality of color values associated with individual pixels of a tile of pixels may be stored.

As shown in FIG. 9, in some examples, operations 902-912 may be performed serially. However, as discussed herein, in general, the operations of FIG. 8 may be performed in another order and some operations may be skipped entirely. Further, as described, the operations of FIG. 9 may be utilized in an attempt to meet a bit budget. In some examples, further operations may be performed to meet the bit budget.

Figure 11:
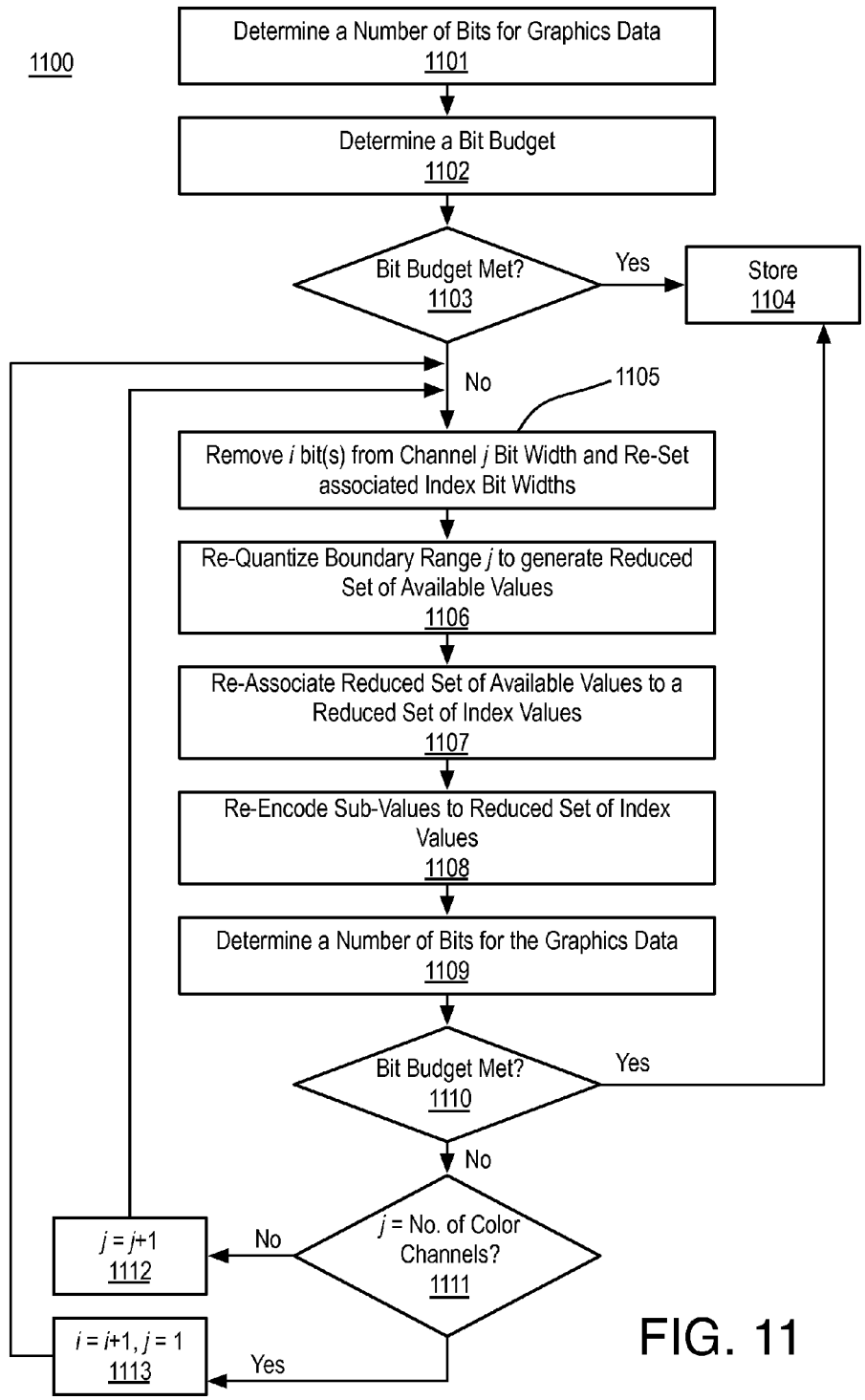
FIG. 11 is a flow chart illustrating an example process.

For example, FIG. 11 describes operations performed with respect to reducing graphics data to meet a desired bit budget. FIG. 11 is a flow chart illustrating an example process, arranged in accordance with at least some implementations of the present disclosure. In some examples, process 1100 may provide a computer-implemented method for providing compression in graphics rendering. In the illustrated implementation, process 1100 may include one or more operations, functions or actions as illustrated by one or more of operations 1101, 1102, 1103, 1104, 1105, 1106, 1107, 1108, 1109, 1110, 1111, 1112, and/or 1113. By way of non-limiting example, process 1100 will be described herein with reference to operations discussed with respect to FIGS. 1-10 and example system 100 discussed below.

Process 1100 may be utilized as a computer-implemented method for providing compression in graphics rendering. Process 1100 may begin at operations (not shown) to determine graphics data having encoded index values and data associated with a bounding box, as discussed herein. In some examples, the encoded index values may include a number of index encoded values that fully encodes or represents one or more bounding range(s) as discussed herein. In some examples, the encoded index values may include a number of index encoded values that are a maximum value or a starting value or the like. In some examples, the number of encoded index values may have been previously reduced using methods discussed herein. In some examples, process 1100 may provide a heuristic method for reducing or shaving bits from the graphics data such that more valuable data may be retained as the bit budget is attempted to be met.

Processing may continue at operation 1101, "Determine a Number of Bits for Graphics Data", where the number of bits for graphics data may be determined by analyzing the graphics data and counting the number of bits of the various components of the graphics data. The graphics data may include any suitable data as discussed herein such as the encoded index values and data representing a bounding box. The data representing a bounding box may include data associated with one or more bounding range(s) as discussed. For example, data associated with a bounding range may include a minimum value for the bounding range and a maximum value for the bounding range. The graphics data may further include one or more bit widths as discussed herein. Furthermore, the graphics data may include a clear-mask enabled indicator bit and/or clearmask bits or other header data or the like.

Processing may continue from operation 1101 to operation 1102, "Determine a Bit Budget", where a bit budget may be determined. The bit budget may be any suitable number of bits. In some examples, the bit budget may be associated with a memory transaction or cache line size or the like. In some examples, the bit budget may be 512 bits or 1024 bits or the like. In some examples, the bit budget may be a fraction of the number of bits of a tile of pixels. For example, the bit budget may be a bit budget of 50% of the number of bits needed to encode tile 110 without compression, 75% of the number of bits needed to encode tile 110 without compression, or the like.

Processing may continue from operation 1102 to operation 1103, "Bit Budget Met?", where the number of bits for the graphics data may be compared with the bit budget. As shown, if the number of bits for the graphics data is less or equal to the bit budget (i.e., the bit budget is met), processing may continue at operation 1104, "Store", where the graphics data may be stored. For example, the graphic data may be stored in memory.

If the number of bits for the graphics data is more than the bit budget (i.e., the bit budget is not met), processing may continue at operations 1105-1109, where bits may be removed from the graphics data until the graphics data meets the bit budget (i.e., the number of bits for the graphics data is less or equal to the bit budget), which is tested at operation 1110. For example, removing the bits may be performed in an iterative process as is discussed further below. Although not shown in FIG. 11 for the sake of clarity of presentation, a minimum bit allowance may also be provided in process 1100. For example, the discussed iterative methods may remove bits only to a certain extent, such as for example, a minimum bit width for the color channels. In some examples, such minimum bit widths may provide for a minimum quality of color data. The minimum bit widths may be different for different channels depending on, for example, the importance of improved granularity for a color channel in a color space.

As discussed, processing may continue at operation 1105, "Remove i bit(s) from Channel j Bit Width and Re-Set associated Index Bit Widths" where a bit (e.g., i may begin at 1) may be removed from a bit width of channel j, which may be a first channel (e.g., j=1) for the removal of a bit. For example, a first bit may be removed from an individual channel's bit width (e.g., j=1), the bit budget may be tested (at operation 1110) and, if subsequent iterations are needed, a first bit may be removed for a second channel (e.g., j=2 at operation 1113), and so on until a first bit is removed for each channel (as determined at operation 1111). If the bit budget is still not met, a second bit may be removed (e.g., i=2) for channel (e.g., j=1) and so on until the bit budget is met or until the minimum thresholds are met (as discussed) and, if the bit budget still is not met, the compression may have deemed to have failed and the graphics data may be stored uncompressed.

As discussed, a first bit may be removed for an individual channel. In various examples, the color channels may be provided in an order for removal of a bit from the bit width of the channel. The channels may be provided in any suitable order. In some examples, the color values may include pseudo luminance/intensity orange chrominance green chrominance alpha (YCoCgA) color values and the order may be A, Cg, Co, Y. Furthermore, reducing the bit width for a channel may also re-set the associated bit width for index values as those values may be equal in the processes discussed herein.

Processing may continue from operation 1105 to operation 1106, "Re-Quantize Boundary Range j to generate Reduced Set of Available Values", where the boundary range associated with color channel j may be re-quantized based on the reduced bit width. For example, a bit width of 6 bits (corresponding to 64 available values, as discussed) may be reduced to a bit width of 5 bits (corresponding to 32 available values) for an A channel in a YCoCgA color space. In some examples, the re-quantize operation may operate as discussed herein with respect to quantizing a bounding range such as, for example, quantizing bounding ranges 420 an 430 and the like to produce a reduced set of available values (similar to available values 520 and 530, but with a greater granularity due to the reduced bit width).

Processing may continue from operation 1106 to operation 1107, "Re-Associate Reduced Set of Available Values to a Reduced Set of Index Values", where the reduced set of available values may be associated with a reduced set of index values. In some examples, the re-associate operation may be performed as discussed herein with respect to associating available values such as, for example, associating available values 520 and 530 with index values 620 and 630 (albeit with a reduced set of index values, as discussed).

Processing may continue from operation 1107 to operation 1108, "Re-Encode Sub-Values to Reduced Set of Index Values", where sub values for color channel j may be re-encoded by re-associating the sub-values with an encoded index value based on the reduced available values and reduced index values. In some examples, the re-encode operation may be performed as discussed with respect to the encode operation discussed herein.

Processing may continue from operation 1108 to operation 1109, "Determine a Number of Bits for Graphics Data", where the number of bits for graphics data may be determined by analyzing the graphics data and counting the number of bits of the various components of the graphics data as discussed herein. Processing may continue from operation 1109 to operation 1110, "Bit Budget Met?", where the number of bits for the (reduced) graphics data may be compared with the bit budget. As shown, if the number of bits for the graphics data is less or equal to the bit budget (i.e., the bit budget is met), processing may continue at operation 1104, "Store", where the graphics data may be stored. For example, the graphic data may be stored in memory.

If the number of bits for the graphics data is more than the bit budget (i.e., the bit budget is not met), processing may continue at operations 1111, "j=No. of Color Channels?", where it may be determined if j is equal to the number of color channels. If j is equal to the number of color channels, processing may continue at operation 1112, "j=j+1" where counter variable j may be increased by one and processing may continue at operation 1105 and a first bit (e.g., i=1) may be removed from the bit width of another color channel. If j is equal to the number of color channels, an equal number of bits (a first bit when i=1) may have been removed for each color channel and processing may continue at operation 1113, "i=i+1,j=1" where counter variable i may be increased by one and a second bit may be removed for the color channels (as needed) and j may be set to 1 so the order of color channels may begin again.

As shown, process 1100 may include a double nested loop such that a first bit is removed from the bit width from each color channel in an order. At each bit removal, the bit budget may be checked. If the bit budget is met, the graphics data may be stored. If the bit budget is not met after removal of a first bit from each channel, a second bit may likewise be removed from each channel in an order and so on until the bit budget is met (or minimum bit width thresholds are met as discussed). In such a manner, a bit budget may be met with the minimum amount of data loss. Furthermore, the value of the data lost may be further mitigated by taking care in choosing the order of the color channels.

As discussed, process 1100 may provide a heuristic method for reducing or shaving bits from the graphics data such that more valuable data may be retained as the bit budget is attempted to be met. In some examples, the following code may be used to reduce bits from graphics data as discussed herein:

```
1   static const int minWidth[4] = {4, 3, 3, 3};
2   int bitsReq = (width[Y] + width[Co] + width[Cg] +
        width[A]}*NUM_PIX;
3   while(bitsReq > bitBudget)
4   {
5       for (int ch = CHANNELS-1; ch >= 0; --ch)
6       {
7           if (bitsReq > bitBudget && width[ch] > minWidth[ch])
8           {
9               width[ch]--;
10              bitsReq -= NUM_PIX;
11          }
12      }
13  }
```

In some examples, process 900 and/or process 1100 may provide for compression in graphics rendering as discussed herein. Process 900 and/or process 1100 may be repeated any number of times either in serial or in parallel, as needed. Furthermore, in general, process 900 and/or process 1100 may be implemented via hardware, software, firmware, or a combination thereof, as is discussed further herein. In some examples, process 900 and/or process 1100 may be applied to "present" render targets (e.g., final render targets to be displayed to a user). In some implementations, it may be advantageous to limit the described techniques to such "present" render targets or a single implementation in a graphics pipeline because multiple implementations of the compression techniques may introduce errors that may grow relatively quickly. By limiting the number of implementations this type of tandem compression error may be limited. In some examples, the discussed techniques may be provided as an optional feature to either a user or a developer in various system implementations (e.g., the discussed techniques or portions thereof could be exposed as a switch available to a user or developer).

Figure 12:
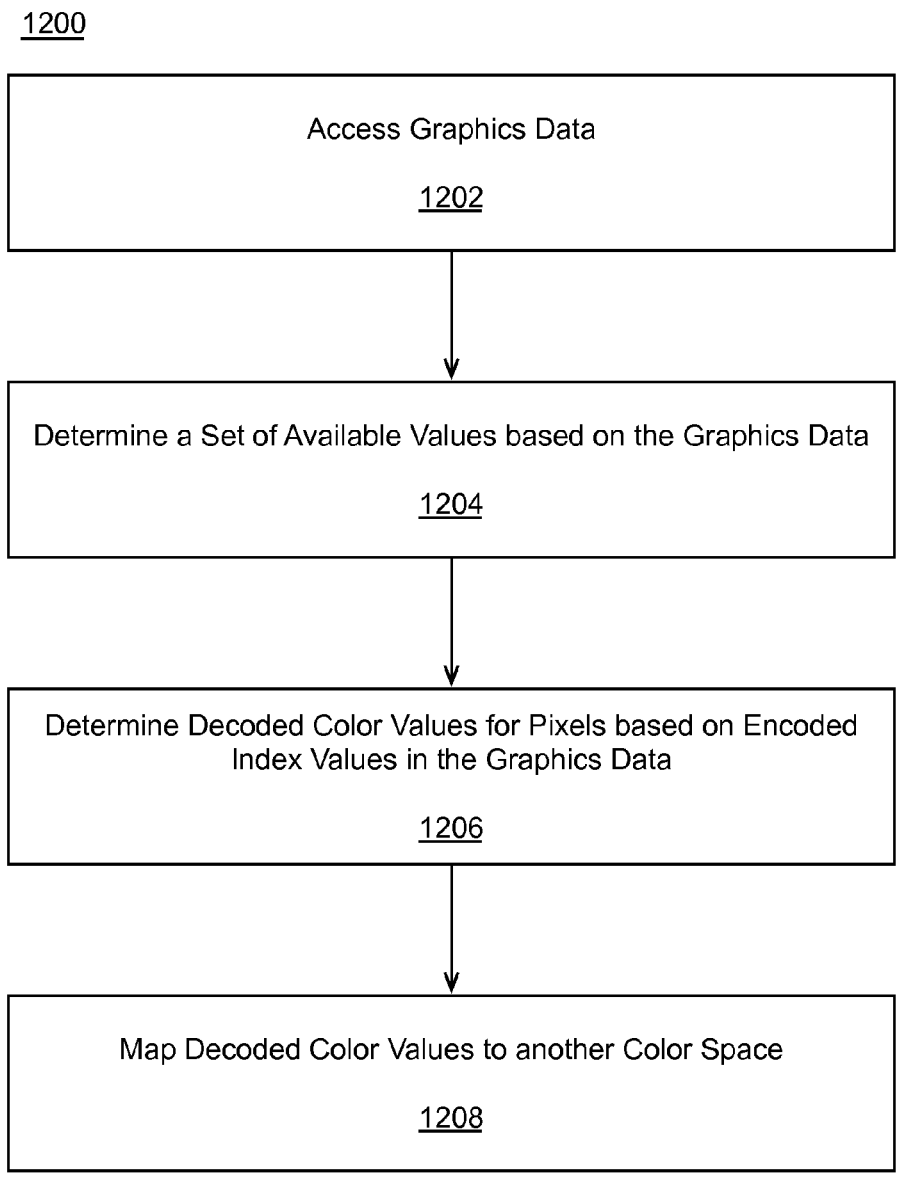
FIG. 12 is a flow chart illustrating an example process.

FIG. 12 is a flow chart illustrating an example process 1200, arranged in accordance with at least some implementations of the present disclosure. In some examples, process 1200 may provide a computer-implemented method for providing decompression in graphics rendering. In the illustrated implementation, process 1200 may include one or more operations, functions or actions as illustrated by one or more of operations 1202, 1204, 1206, and/or 1208. By way of non-limiting example, process 1200 will be described herein with reference to operations discussed with respect to FIGS. 1-11 above and example system 100 discussed below.

Process 1200 may be utilized as a computer-implemented method for providing decompression in graphics rendering. Process 1200 may begin at operation 1202, "Access Graphics Data" where graphics data may be accessed. For example, the graphics data may include encoded index values and data associated with a bounding box as described herein. For example, the graphics data may be accessed or read via memory. In some examples, the graphics data may include encoded index values 728 and 738 as discussed (not illustrated, see, e.g., FIG. 7). In some examples the graphics data may include graphics data 800 (not illustrated, see, e.g., FIG. 8).

Processing may continue from operation 1202 to operation 1204, "Determine a Set of Available Values based on the Graphics Data", where available values may be determined based on the graphics data. For example, the data associated with the bounding box may include minimum and maximum values for bounding ranges and bit widths for the bounding ranges. Based on the minimum and maximum values and the bit width for a bounding range, the available values may be determined. For example, the bit width (k) may be used to determine the number of available values as $2^k$ (e.g., for a bit width of 3, the number of available values is $2^3=8$). Furthermore, the minimum and maximum values may be available values and the available values between the minimum and maximum values may be determined by dividing the range equally. For example, the available values may be given as [(MAX−MIN)/(Available Values−2)}*i+MIN, where i is a counter variable running from 2 to Available Values minus 1. For example, available values 520, 530 may be determined using such techniques.

Processing may continue from operation 1204 to operation 1206, "Determine Decoded Color Values for Pixels based on Encoded Index Values in the Graphics Data", where decoded color values may be determined for any number of pixels. For example, decoded color values 735 and 725 (described above as "closest available color values") may be determined by decoding encoded index values and associating pixels 120 with decoded sub-values. In some examples, the decoded color values may be lossy with respect to the "actual" color values 130 described above (not illustrated, see, e.g., FIG. 1). The decoding may be performed using any suitable technique or techniques. For example, the available values determined at operation 1204 may be associated with index values based on a predetermined method (such as the index values increasing as the available values increase) and each sub-value may be decoded based on the associated index value. In some examples, the decoding may be performed on data having a predetermined structure such as the structure discussed with respect to graphics data 800 (not illustrated, see, e.g., FIG. 8).

Processing may continue from operation 1206 to operation 1208, "Map Decoded Color Values to another Color Space", where the decoded color values may be mapped to another color space. As discussed, in some examples, color values may be mapped to another color space to enhance compression. In such examples, the decompressed color values may be mapped to the previous color space In other examples, the color data may need to be mapped based on system requirements or compatibility or the like. In any event, the colors may be mapped based on known techniques. In some examples, decoded color values in the pseudo luminance/intensity orange chrominance green chrominance alpha (YCoCgA) color space may be mapped to color values in the red green blue alpha (RGBA) color space.

In some examples, process 1200 may provide for decompression in graphics rendering as discussed herein. Process 1200 may be repeated any number of times either in serial or in parallel, as needed. Furthermore, in general, process 1200 may be implemented via hardware, software, firmware, or a combination thereof, as is discussed further herein.

In some examples, the techniques discussed herein may provide for substantial data compression in a flexible compression format with maintained image quality. For example, in video compression, the resulting decompressed video show little to no temporal artifacts.

Some additional and/or alternative details related to process 900, 1100 or 1200 may be illustrated in one or more examples of implementations discussed in greater detail below with regard to FIG. 13.

Figure 13:
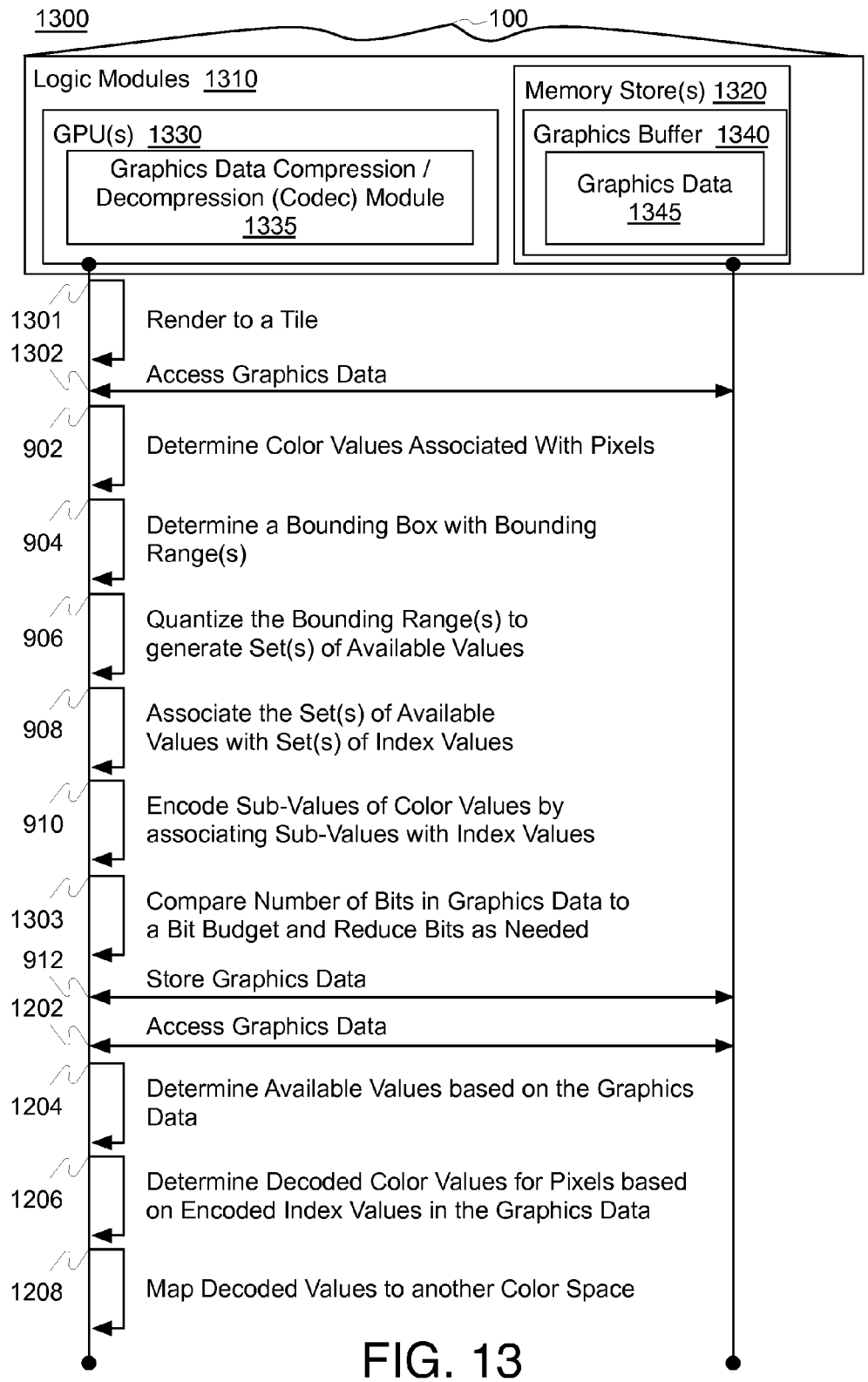
FIG. 13 is an illustrative diagram of example system and process for providing compression and/or decompression in graphics rendering.

FIG. 13 is an illustrative diagram of example system 100 and process 1300 for providing compression and/or decompression in graphics rendering, arranged in accordance with at least some implementations of the present disclosure. In the illustrated implementation, process 1300 may include one or more operations, functions or actions as illustrated by one or more of actions 1301, 1302, 902, 904, 906, 908, 910, 1303, 912, 1202, 1206, 1206, and/or 1208. By way of non-limiting example, process 1300 also will be described herein with reference to example video coding system 100 of FIG. 14, as is described herein below.

In the illustrated implementation, system 100 may include logic modules 1310, the like, and/or combinations thereof. For example, logic modules 1310, may include memory store(s) 1320, graphics processing unit(s) 1330, which may include graphics data compression/decompression ("codec") module 1335, and graphics buffer 1340, the like, and/or combinations thereof. In various examples, graphics data codec module 1335 may provide compression or decompression or both.

Graphics data codec module 1335, for example, may be configured to determine a plurality of color values associated with a plurality of pixels, wherein the plurality of color values comprise sub-values corresponding to a plurality of color channels, determine a bounding box for the sub-values, wherein the bounding box comprises one or more bounding ranges for one or more of the plurality of color channels, quantize the one or more bounding ranges to generate one or more sets of available values, associate the one or more sets of available values with one or more sets of index values, encode sub-values corresponding to one or more of the plurality of color channels by associating the sub-values with an encoded index value from the corresponding set of index values to generate encoded index values, and store, in graphics buffer 1340, graphics data 1345 including the encoded index values and data associated with the bounding box. Graphics data codec module 1335 may be further configured to remove bits from the graphics data until the graphics data is less than or equal to the bit budget, as discussed herein. In such a manner, graphics data codec module 1335 may provide compression for graphics data such as color values associated with pixels of a tile of pixels, for example.

Graphics data codec module 1335 (or another module of graphics processing unit(s) 1230) may be further configured to access graphics data 1345, determine, based on data associated with a bounding box and one or more bit widths in graphics data 1345, one or more sets of available values, determine, based on encoded index values in graphics data 1345, a plurality of decoded color values for the plurality of pixels such that the decoded color values are lossy with respect to the plurality of color values, and to optionally map the plurality of decoded color values from to another color space. In such a manner, graphics data codec module 1335 (or another module of graphics processing unit(s) 1330) may provide decompression for graphics data such as color values associated with pixels of a tile of pixels, for example. As discussed, in some examples, graphics data codec module 1335 may be configured to provide both compression and decompression. In other examples, compression and decompression may be provided by separate modules (e.g., compression module(s) and decompression module(s)).

Process 1300 may be utilized as a computer-implemented method for providing compression and/or decompression in graphics rendering. Process 1300 may begin at operation 1301, "Render to a Tile", where a tile of pixels may be rendered. The tile may be rendered using any suitable techniques and may generate a tile of pixels as discussed herein. The rendering may be based on any suitable data such as image data, model, models, or model data, scene data, vector data, raster data, or the like.

Processing may continue from operation 1301 to operation 1302, "Access Graphics Data", where graphics data codec module 1335 may access graphics data 1345 via graphics buffer 1340 of memory stores 1320. Graphics data 1345 may contain any data as discussed herein. In some examples, the graphics data may include uncompressed pixel color values such as, for example, color values 130 (not illustrated, see, e.g., FIG. 1).

Processing may continue from operation 1302 to operation 902, "Determine Color Values Associated With Pixels", where graphics data codec module 1335 may determine a plurality of color values associated with pixels (e.g., of a tile of pixels) as discussed herein. Processing may continue from operation 902 to operation 904, "Determine a Bounding Box with Bounding Range(s)", where graphics data codec module 1335 may determine a bounding box having one or more bounding ranges as discussed herein. Processing may continue from operation 904 to operation 906, "Quantize the Bounding Range(s) to generate Set(s) of Available Values", where graphics data codec module 1335 may quantize the one or more bounding ranges to generate one or more sets of available values as discussed herein. Processing may continue from operation 906 to operation 908, "Associate the Set(s) of Available Values with Set(s) of Index Values", where graphics data codec module 1335 may associate the one or more sets of available values with one or more sets of index values as discussed herein. Processing may continue from operation 908 to operation 910, "Encode Sub-Values of Color Values by associating Sub-Values with Index Values", where graphics data codec module 1335 may encode the sub-values corresponding to the one or more color channels by associating the sub-values with an encoded index value from the corresponding set of index values.

Processing may continue from operation 910 to operation 1303, "Compare Number of Bits in Graphics Data to a Bit Budget and Reduce Bits as Needed", where graphics data codec module 1335 may compare the number of bits in the graphics data to a bit budget and reduce the number of bits as needed. For example, if the number of bits meets the bit budget, no bits may be removed. If the number of bits does not meet the bit budget, bits may be removed using the techniques discussed herein such as, for example, the techniques discussed with respect to process 1100 illustrated in FIG. 11. Processing may continue from operation 1303 to operation 912, "Store Graphics Data Including Encoded Index Values and Data Associated with Bounding Box", where graphics data codec module 1335 may store graphics data 1345 including the encoded index values and data associated with the bounding box. In some examples, graphics data 1345 (after compression and storage) may include graphics data 800 (not illustrated, see, e.g., FIG. 8) as discussed herein. As discussed, in some examples, graphics data 1345 may be transmitted from system to another system (not shown) either instead of or in addition to being stored at system 100.

In some examples, operations 1301, 1302, 902, 904, 906, 908, 910, 1303, and/or 912 may provide graphics data compression. Such compression may occur when storing graphics data into graphics buffer 1340, on a cache evict of graphics buffer 1340, or the like. As discussed, in some examples, the discussed compression techniques may be applied to "present" render targets (e.g., final render targets to be displayed to a user).

Processing may continue from operation 912 to operation 1202 or, if previously compressed graphics data are provided (either via storage at system 100 or via being received by system 100), processing may begin at operation 1202, "Access Graphics Data", where graphics data codec module 1335 may access compressed graphics data 1345 via graphics buffer 1340 of memory stores 1320. For example, graphics data 1345 may include encoded index values and data associated with a bounding box as described herein. Processing may continue from operation 1202 to operation 1204, "Determine a Set of Available Values based on the Graphics Data", where graphics data codec module 1335 may determine available values based on graphics data 1345 as discussed herein. Processing may continue from operation 1204 to operation 1206, "Determine Decoded Color Values for Pixels based on Encoded Index Values in the Graphics Data", where graphics data codec module 1335 may determine decoded color values for any number of pixels based on graphics data 1345 as discussed herein. Processing may continue from operation 1206 to operation 1208, "Map Decoded Color Values to another Color Space", where graphics data codec module 1335 the decoded color values may be optionally mapped to another color space as discussed herein.

In some examples, operations 1202, 1204, 1206, and/or 1208 may provide graphics data decompression. Such decompression may occur when using or preparing to use graphics data 1345. For example, such decompressed graphics data may be used for rendering a tile, displaying an image, or the like. In some examples, graphics data 1345 may be received at system 100 or the like from another system (not shown) for decompression using the described techniques.

Process 1300 (or the processes described with respect to operations 1301, 1302, 902, 904, 906, 908, 910, 1303, and/or 912 or operations 1202, 1204, 1206, and/or 1208) may be repeated any number of times either in serial or in parallel, as needed. Furthermore, in general, graphics data codec module 1335 may be implemented via hardware, software, and/or firmware. As shown, in some implementations, graphics data codec module 1335 may be implemented via graphics processing unit(s) 1330. In other implementations, graphics data codec module 1335 may be implemented via software implemented via one or more central processing unit(s). In some examples, graphics data codec module 1335 and/or the operations discussed herein may be enabled or enabled at a system, user, or developer level, for example.

While implementation of example processes 900, 1100, 1200, 1300 and other processes discussed herein may include the undertaking of all operations shown in the order illustrated, the present disclosure is not limited in this regard and, in various examples, implementation of the processes discussed herein may include the undertaking only a subset of the operations shown and/or in a different order than illustrated.

In addition, any one or more of the operations discussed herein (such as the operations illustrated and discussed with respect to FIGS. 1-13) may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the operations or operations discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
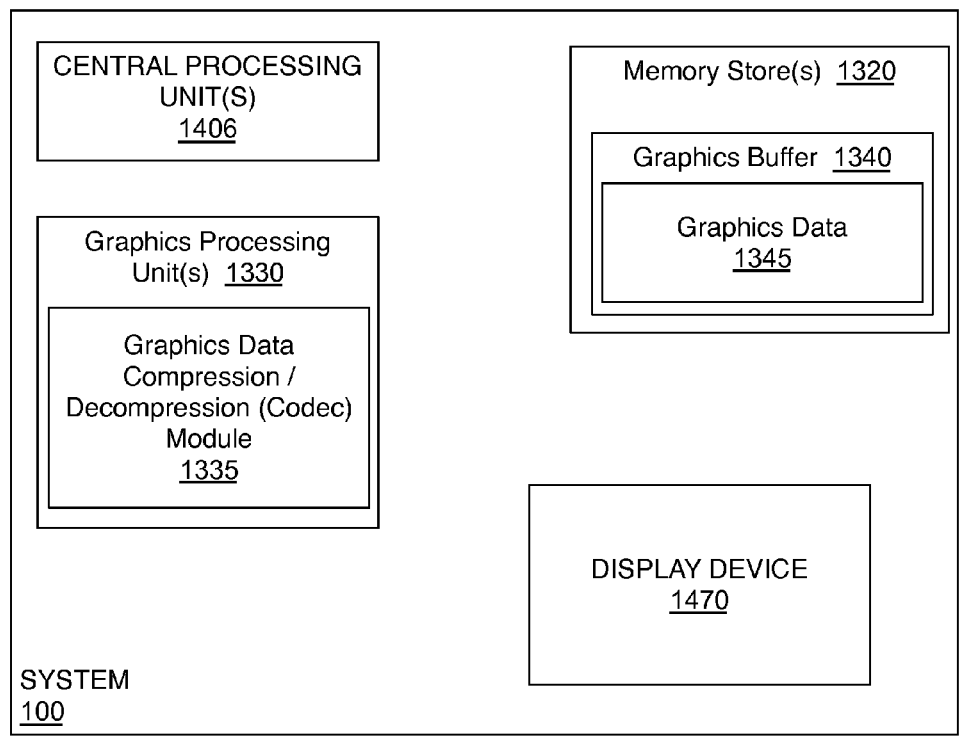
FIG. 14 is an illustrative diagram of an example system for compression and/or decompression providing graphics rendering.

FIG. 14 is an illustrative diagram of an example system 100 for providing compression and/or decompression in graphics rendering, arranged in accordance with at least some implementations of the present disclosure. In the illustrated implementation, system 100 may include one or more central processing units 1406, one or more memory stores 1320, one or more graphics processing units 1330, graphics buffer 1340 and/or a display device 1470. Central processing units 1406, memory store 1320, graphics processing units 1330, buffer 1340, and/or display device 1470 may be capable of communication with one another, via, for example, a bus or other access. In various implementations, display device 1470 may be integrated in system 100 or implemented separately from system 100.

As shown in FIG. 14, and discussed above, graphics data codec module 1335 may be implemented via graphics processing units 1330. In other example, graphics data codec module 1335 may be implemented via central processing units 1406. As shown, graphics processing unit 1330 may include graphics data codec module 1335. Graphics processing unit 1330 may be communicatively coupled to graphics buffer 1340. Graphics data codec module 1335 may be configured to determine a plurality of color values associated with a plurality of pixels, wherein the plurality of color values comprise sub-values corresponding to a plurality of color channels, determine a bounding box for the sub-values, wherein the bounding box comprises one or more bounding ranges for one or more of the plurality of color channels, quantize the one or more bounding ranges to generate one or more sets of available values, associate the one or more sets of available values with one or more sets of index values, encode sub-values corresponding to one or more of the plurality of color channels by associating the sub-values with an encoded index value from the corresponding set of index values to generate encoded index values, and store, in graphics buffer 1340, graphics data 1345 including the encoded index values and data associated with the bounding box. Memory stores 1320 may be communicatively coupled to graphics processing unit 1330. Memory stores 1320 may include graphics buffer 1340, which may be accessed by graphics data codec module 1335 to retrieve graphics data 1345. Furthermore, display device 1470 may be configured to display output image data (not shown) based at least in part on graphics data 1345. As discussed, graphics data codec module 1335 may be further configured to access and/or decompress graphics data 1345 as discussed herein.

As will be appreciated, the modules illustrated in FIG. 14 may include a variety of software and/or hardware modules and/or modules that may be implemented via software and/or hardware. For example, the modules may be implemented as software via central processing units 1406 and/or graphics processing units 1330 or the modules may be implemented via a dedicated hardware portion or portions of graphics processing units 1330. Furthermore, the shown memory stores 1320 may be shared memory for central processing units 1406 and/or graphics processing units 1320, for example. Furthermore, graphics buffer 1340 may be implemented via memory stores 1320 or separately from memory stores 1320 and/or graphics buffer 1340 may be implemented via a general buffer that may include other buffer portions such as a render buffer, or the like. Also, system 100 may be implemented in a variety of ways. For example, system 100 (excluding display device 1470) may be implemented as a single chip or device having a graphics processor, a quad-core central processing unit, on-board cache, and a memory controller input/output (I/O) module (not shown). In other examples, system 100 (again excluding display device 1470) may be implemented as a chipset.

Central processing units 1406 may include any suitable implementation including, for example, microprocessor(s), multicore processors, application specific integrated circuits, chip(s), chipsets, or the like. Furthermore, graphics processing units 1330 may include any suitable implementation including, for example, processor(s), multicore processors, application specific integrated circuits, programmable logic devices, graphics cards, integrated graphics, general purpose graphics processing unit(s), or the like. In addition, memory stores 1320 and/or graphics buffer 1340 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1320 and/or graphics buffer 1340 may be implemented via cache memory. In various examples, system 100 may be implemented as a chipset or as a system on a chip.

Figure 15:
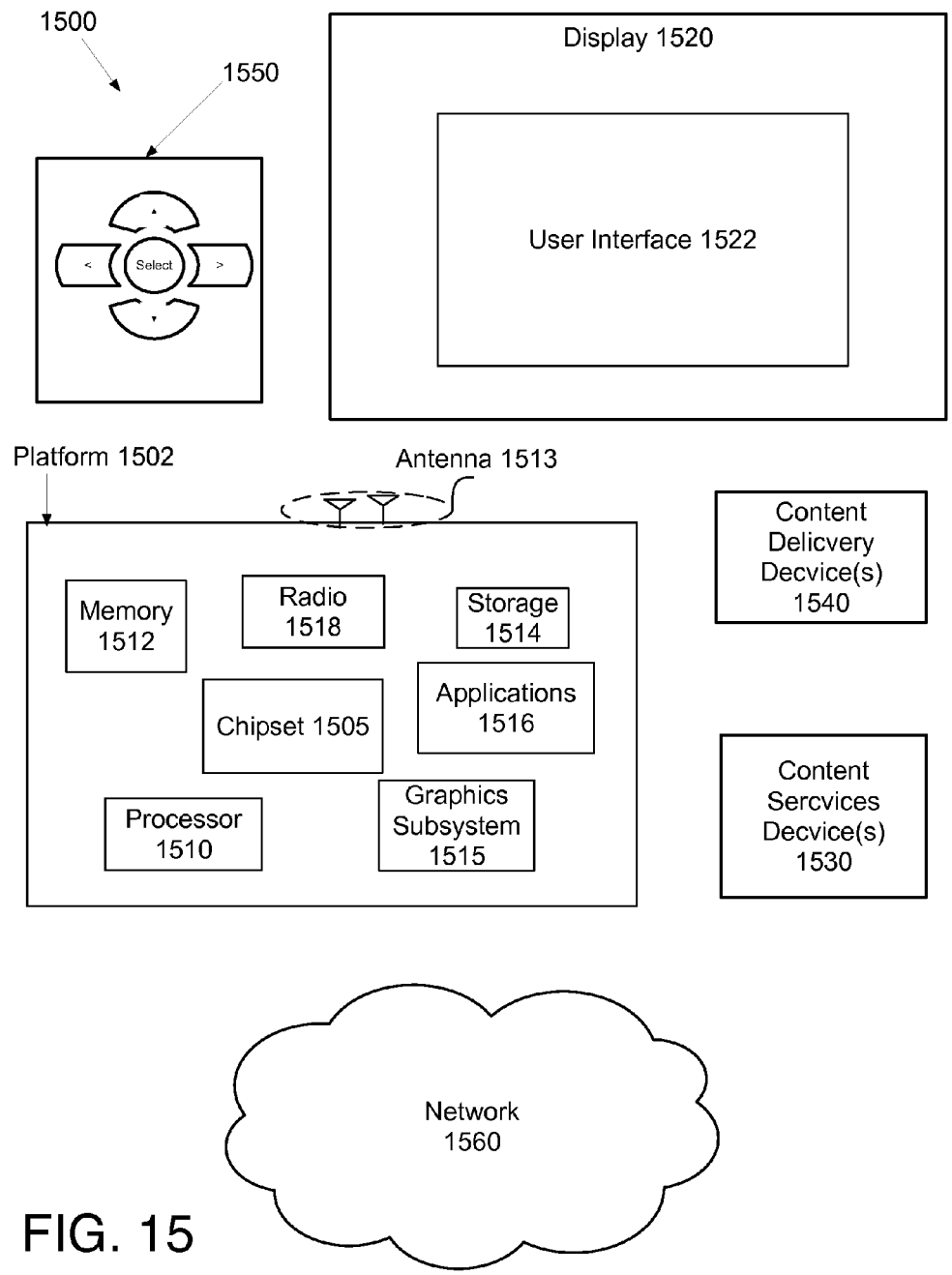
FIG. 15 is an illustrative diagram of an example system.

FIG. 15 illustrates an example system 1500 in accordance with the present disclosure. In various implementations, system 1500 may be a media system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, Display Port, wireless HDMI, and/or wireless HD compliant techniques. Graphics subsystem 1515 may be integrated into processor 1510 or chipset 1505. In some implementations, graphics subsystem 1515 may be a stand-alone card communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of unidirectionally or bidirectionally communicating content between content providers and platform 1502 and/display 1520, via network 1560 or directly. It will be appreciated that the content may be communicated unidirectionally and/or bidirectionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of controller 1550 may be used to interact with user interface 1522, for example. In embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In embodiments, controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 7.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
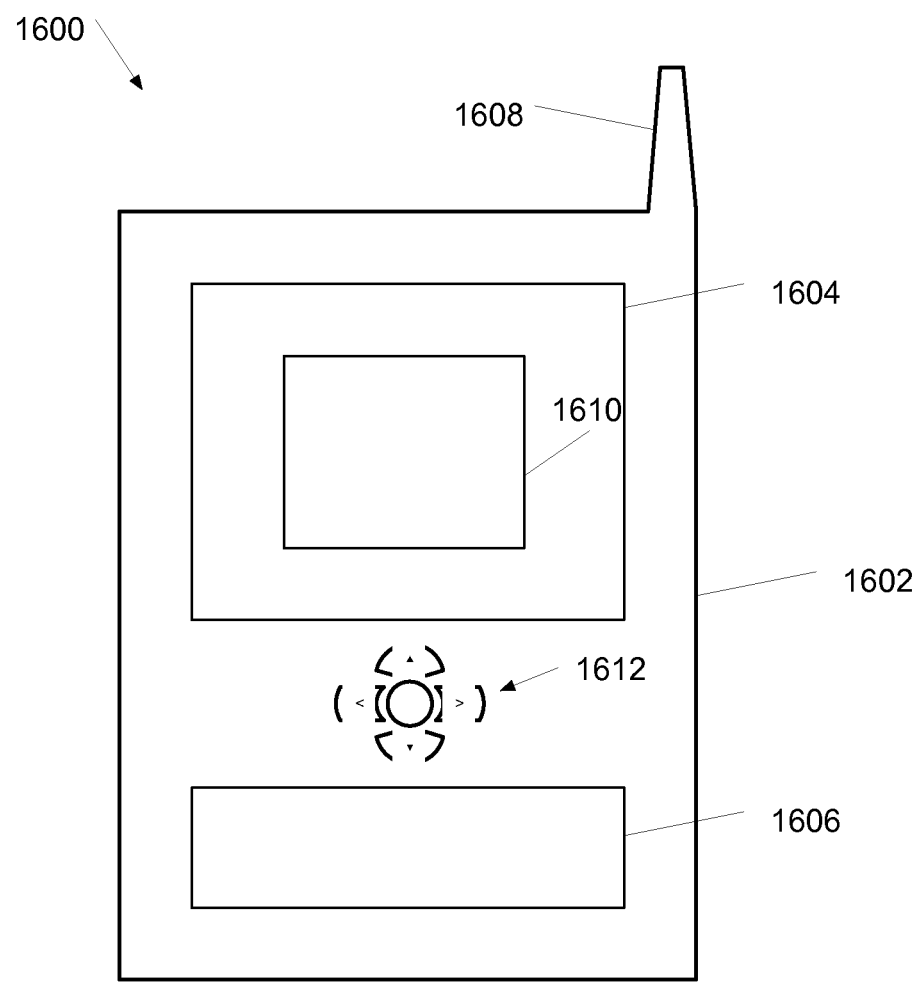
FIG. 16 illustrates an example device, all arranged in accordance with at least some implementations of the present disclosure.

As described above, system 1500 may be embodied in varying physical styles or form factors. FIG. 16 illustrates implementations of a small form factor device 1600 in which system 1600 may be embodied. In embodiments, for example, device 1600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 1600 may include a housing 1602, a display 1604, an input/output (I/O) device 1606, and an antenna 1608. Device 1600 also may include navigation features 1612. Display 1604 may include any suitable display unit for displaying information appropriate for a mobile computing device. I/O device 1606 may include any suitable I/O device for entering information into a mobile computing device. Examples for I/O device 1606 may include an alphanumeric keyboard, a numeric keypad, a touch pad, input keys, buttons, switches, rocker switches, microphones, speakers, voice recognition device and software, and so forth. Information also may be entered into device 1600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional embodiments.

In one example, a computer-implemented method for providing compression in graphics rendering may include determining a plurality of color values associated with a plurality of pixels such that the plurality of color values comprise sub-values corresponding to a plurality of color channels, determining a bounding box for the sub-values such that the bounding box may include one or more bounding ranges for one or more of the plurality of color channels, quantizing the one or more bounding ranges to generate one or more sets of available values, associating the one or more sets of available values with one or more sets of index values, encoding the sub-values corresponding to one or more of the plurality of color channels by associating the sub-values with an encoded index value from a corresponding set of index values of the one or more index values to generate encoded index values, and storing, in memory, graphics data comprising the encoded index values and data associated with the bounding box.

In further examples of a computer-implemented method for providing compression in graphics rendering may include setting one or more bit widths corresponding to the one or more bounding ranges, the one or more bit widths including a number of bits for representing the corresponding one or more available values, setting one or more index bit widths for the one or more sets of index values to the one or more bit widths, determining a number of bits for the graphics data such that the graphic data may include data associated with the plurality of bounding ranges such that the data associated with the plurality of bounding ranges may include a minimum value and a maximum value for each of the plurality of bounding ranges, such that the graphics data may further include the one or more bit widths, and such that the graphics data may further include a clearmask enabled indicator bit and clearmask bits, determining a bit budget, comparing the number of bits for the graphics data with the bit budget, and, if the number of bits for the graphics data is less than or equal to the bit budget, storing, in memory, the graphics data, and, if the number of bits for the graphics data is greater than the bit budget, removing bits from the graphics data until the graphics data is less than or equal to the bit budget to generate reduced graphics data and subsequently storing in memory, the reduced graphics data such that removing bits from the graphics data comprises, iteratively, in an order of the plurality of color channels: reducing an individual one of the one or more bit widths by one or more bits, re-setting an individual one of the one or more index bit widths to the reduced one or more bit widths, re-quantizing an individual one the one or more boundary ranges to generate one or more reduced sets of available values, re-associating an individual one the one or more reduced sets of available values with one or more reduced sets of index values, re-encoding an individual set of the sub-values corresponding to the one or more of the plurality of color channels by re-associating each of the sub-values with a reduced encoded index value from the corresponding set of reduced index values to generate reduced encoded index values, re-determining a reduced number of bits for the reduced graphics data, re-comparing the reduced number of bits for the graphics data with the bit budget, and, if the reduced number of bits for the graphics data is less than or equal to the bit budget, storing, in memory, the reduced graphics data, and, if the number of bits for the reduced graphics data is greater than the bit budget, performing another iteration so long as the individual one of the one or more bit widths is greater than a minimum threshold bit width. The color values may include pseudo luminance/intensity orange chrominance green chrominance alpha (YCoCgA) color values and wherein the order may be A, Cg, Co, Y. The computer-implemented method for providing compression in graphics rendering may further include rendering the plurality of pixels, accessing the graphics data such that accessing the graphics data may include reading the graphics data from the memory, determining, based at least in part on the data associated with the bounding box and the one or more bit widths, the one or more sets of available values, determining, based at least in part on the encoded index values, a plurality of decoded color values for the plurality of pixels such that the decoded color values may be lossy with respect to the plurality of color values, and mapping the plurality of decoded color values from a third color space to a fourth color space. The third color space may include the pseudo luminance/intensity orange chrominance green chrominance alpha (YCoCgA) color space and the fourth color space may include the red green blue alpha (RGBA) color space. The plurality of color values may include at least one of red green blue alpha (RGBA) color values or pseudo luminance/intensity orange chrominance green chrominance alpha (YCoCgA) color values. The bounding box may include at least one of one bounding range, two bounding ranges, three bounding ranges, or four bounding ranges. Determining the plurality of color values may include mapping from a first color space to a second color space such that the second color space may be associated with the plurality of color channels, the first color space may include a red green blue alpha (RGBA) color space, and the second color space may include a pseudo luminance/intensity orange chrominance green chrominance alpha (YCoCgA) color space. The plurality of pixels may include a tile of pixels and the tile of pixels may include an 8 pixels wide by 4 pixels high tile of pixels. The bounding box may include a bounding range for each of the plurality of color channels. A first bit width of the one or more bit widths may be at least one of 0, 1, 2, 4, 8, 16, or 32 bits. A second bit width of the one or more bit widths may be 0 bits and, for a corresponding second color channel of the plurality of color channels, the encoded index values may include no data.

In another example, a system for compression in graphics rendering on a computer may include a graphics buffer and a graphics processing unit, and a display device. The graphics processing unit may include a graphics codec module. The graphics processing unit may be communicatively coupled to the graphics buffer and the graphics codec module may be configured to determine a plurality of color values associated with a plurality of pixels, wherein the plurality of color values comprise sub-values corresponding to a plurality of color channels, determine a bounding box for the sub-values, wherein the bounding box comprises one or more bounding ranges for one or more of the plurality of color channels, quantize the one or more bounding ranges to generate one or more sets of available values, associate the one or more sets of available values with one or more sets of index values, encode the sub-values corresponding to one or more of the plurality of color channels by associating the sub-values with an encoded index value from a corresponding set of index values of the one or more index values to generate encoded index values, and store in the graphics buffer, graphics data comprising the encoded index values and data associated with the bounding box.

In other examples of systems for providing compression in graphics rendering on a computer, the graphics codec module may be further include a display device. The display device may be configured to display output image data based at least in part on the graphics data. The graphics coded module may be further configured to set one or more bit widths corresponding to the one or more bounding ranges, the one or more bit widths including a number of bits for representing the corresponding one or more available values, set one or more index bit widths for the one or more sets of index values to the one or more bit widths, determine a number of bits for the graphics data such that the graphic data includes data associated with the plurality of bounding ranges, such that the data associated with the plurality of bounding ranges includes a minimum value and a maximum value for each of the plurality of bounding ranges, such that the graphics data further includes the one or more bit widths, and such that the graphics data further includes a clearmask enabled indicator bit and clearmask bits, determine a bit budget, compare the number of bits for the graphics data with the bit budget, and, if the number of bits for the graphics data is less than or equal to the bit budget, store, in graphics buffer, the graphics data, and, if the number of bits for the graphics data is greater than the bit budget, remove bits from the graphics data until the graphics data is less than or equal to the bit budget to generated reduced graphics data and subsequently store in the graphics buffer the reduced graphics data, wherein to remove bits from the graphics data the graphics data codec module is configured to, iteratively, in an order of the plurality of color channels: reduce an individual one of the one or more bit widths by one or more bits, re-set an individual one of the one or more index bit widths to the reduced one or more bit widths, re-quantize an individual one the one or more boundary ranges to generate one or more reduced sets of available values, re-associate an individual one the one or more reduced sets of available values with one or more reduced sets of index values, re-encode an individual set of the sub-values corresponding to the one or more of the plurality of color channels by re-associating each of the sub-values with a reduced encoded index value from the corresponding set of reduced index values to generate reduced encoded index values, re-determine a reduced number of bits for the reduced graphics data, re-compare the reduced number of bits for the graphics data with the bit budget, and, if the reduced number of bits for the graphics data is less than or equal to the bit budget, store, in the graphics buffer, the reduced graphics data, and, if the number of bits for the reduced graphics data is greater than the bit budget, perform another iteration so long as the individual one of the one or more bit widths is greater than a minimum threshold bit width, such that the color values may include pseudo luminance/intensity orange chrominance green chrominance alpha (YCoCgA) color values and the order may be A, Cg, Co, Y, render the plurality of pixels, access the graphics data such that accessing the graphics data includes reading the graphics data from the graphics buffer, determine, based at least in part on the data associated with the bounding box and the one or more bit widths, the one or more sets of available values, determine, based at least in part on the encoded index values, a plurality of decoded color values for the plurality of pixels such that the decoded color values are lossy with respect to the plurality of color values, and map the plurality of decoded color values from a third color space to a fourth color space, such that the third color space may include the pseudo luminance/intensity orange chrominance green chrominance alpha (YCoCgA) color space, and wherein the fourth color space may include the red green blue alpha (RGBA) color space. The plurality of color values may include at least one of red green blue alpha (RGBA) color values or pseudo luminance/intensity orange chrominance green chrominance alpha (YCoCgA) color values. The bounding box may include at least one of one bounding range, two bounding ranges, three bounding ranges, or four bounding ranges. Determining the plurality of color values may include mapping from a first color space to a second color space such that the second color space may be associated with the plurality of color channels, the first color space may include a red green blue alpha (RGBA) color space, and the second color space may include a pseudo luminance/intensity orange chrominance green chrominance alpha (YCoCgA) color space. The plurality of pixels may include a tile of pixels and the tile of pixels may include an 8 pixels wide by 4 pixels high tile of pixels. The bounding box may include a bounding range for each of the plurality of color channels. A first bit width of the one or more bit widths may be at least one of 0, 1, 2, 4, 8, 16, or 32 bits. A second bit width of the one or more bit widths may be 0 bits and, for a corresponding second color channel of the plurality of color channels, the encoded index values may include no data.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:
1. A computer-implemented method for providing compression in graphics rendering comprising:
  determining a plurality of color values associated with a plurality of pixels, wherein the plurality of color values comprise sub-values corresponding to a plurality of color channels;
  determining a bounding box for the sub-values, wherein the bounding box comprises one or more bounding ranges for one or more of the plurality of color channels;
  setting one or more bit widths corresponding to the one or more bounding ranges;
  setting one or more index bit widths for the one or more sets of index values to the one or more bit widths;
  quantizing the one or more bounding ranges to generate one or more sets of available values, the one or more bit widths comprising a number of bits for representing the corresponding one or more available values;
  associating the one or more sets of available values with one or more sets of index values;

encoding the sub-values corresponding to one or more of the plurality of color channels by associating the sub-values with an encoded index value from a corresponding set of index values of the one or more index values to generate encoded index values; and storing, in memory, graphics data comprising the encoded index values and data associated with the bounding box.

2. The method of claim 1, further comprising:
determining a number of bits for the graphics data, wherein the graphic data comprises data associated with the plurality of bounding ranges, wherein the data associated with the plurality of bounding ranges comprises a minimum value and a maximum value for each of the plurality of bounding ranges, wherein the graphics data further comprises the one or more bit widths;
determining a bit budget;
comparing the number of bits for the graphics data with the bit budget, and
if the number of bits for the graphics data is less than or equal to the bit budget, storing, in memory, the graphics data; and
if the number of bits for the graphics data is greater than the bit budget, removing bits from the graphics data until the graphics data is less than or equal to the bit budget to generate reduced graphics data and subsequently storing in memory the reduced graphics data.

3. The method of claim 1, further comprising:
determining a number of bits for the graphics data, wherein the graphic data comprises data associated with the plurality of bounding ranges, wherein the data associated with the plurality of bounding ranges comprises a minimum value and a maximum value for each of the plurality of bounding ranges, wherein the graphics data further comprises the one or more bit widths;
determining a bit budget;
comparing the number of bits for the graphics data with the bit budget, and
if the number of bits for the graphics data is less than or equal to the bit budget, storing, in memory, the graphics data; and
if the number of bits for the graphics data is greater than the bit budget, removing bits from the graphics data until the graphics data is less than or equal to the bit budget to generate reduced graphics data and subsequently storing in memory the reduced graphics data, wherein removing bits from the graphics data comprises, iteratively, in an order of the plurality of color channels:
reducing an individual one of the one or more bit widths by one or more bits;
re-setting an individual one of the one or more index bit widths to the reduced one or more bit widths;
re-quantizing an individual one the one or more boundary ranges to generate one or more reduced sets of available values;
re-associating an individual one the one or more reduced sets of available values with one or more reduced sets of index values;
re-encoding an individual set of the sub-values corresponding to the one or more of the plurality of color channels by re-associating each of the sub-values with a reduced encoded index value from the corresponding set of reduced index values to generate reduced encoded index values;
re-determining a reduced number of bits for the reduced graphics data;
re-comparing the reduced number of bits for the graphics data with the bit budget, and
if the reduced number of bits for the graphics data is less than or equal to the bit budget, storing, in memory, the reduced graphics data; and
if the number of bits for the reduced graphics data is greater than the bit budget, performing another iteration so long as the individual one of the one or more bit widths is greater than a minimum threshold bit width.

4. The method of claim 1, wherein determining the plurality of color values comprises mapping from a first color space to a second color space, wherein the second color space is associated with the plurality of color channels.

5. The method of claim 1, wherein determining the plurality of color values comprises mapping from a first color space to a second color space, wherein the second color space is associated with the plurality of color channels, wherein the first color space comprises a red green blue alpha (RGBA), and wherein the second color space comprises a pseudo luminance/intensity orange chrominance green chrominance alpha (YCoCgA) color space.

6. The method of claim 1, wherein the bounding box comprises at least one of one bounding range, two bounding ranges, three bounding ranges, or four bounding ranges.

7. The method of claim 1, further comprising:
accessing the graphics data, wherein accessing the graphics data comprises reading the graphics data from the memory;
determining, based at least in part on the data associated with the bounding box and the one or more bit widths, the one or more sets of available values; and
determining, based at least in part on the encoded index values, a plurality of decoded color values for the plurality of pixels, wherein the decoded color values are lossy with respect to the plurality of color values.

8. The method of claim 1, further comprising:
accessing the graphics data, wherein accessing the graphics data comprises reading the graphics data from the memory;
determining, based at least in part on the data associated with the bounding box and the one or more bit widths, the one or more sets of available values;
determining, based at least in part on the encoded index values, a plurality of decoded color values for the plurality of pixels, wherein the decoded color values are lossy with respect to the plurality of color values; and
mapping the plurality of decoded color values from a pseudo luminance/intensity orange chrominance green chrominance alpha (YCoCgA) color space to a red green blue alpha (RGBA) color space.

9. The method of claim 1, wherein the plurality of color values comprise at least one of red green blue alpha (RGBA) color values or pseudo luminance/intensity orange chrominance green chrominance alpha (YCoCgA) color values.

10. The method of claim 1, further comprising:
rendering the plurality of pixels.

11. The method of claim 1, further comprising:
determining a number of bits for the graphics data, wherein the graphic data comprises data associated with the plurality of bounding ranges, wherein the data associated with the plurality of bounding ranges comprises a minimum value and a maximum value for each of the plurality of bounding ranges, wherein the graphics data further comprises the one or more bit widths, and wherein the graphics data further comprises a clearmask enabled indicator bit and clearmask bits;

determining a bit budget;
comparing the number of bits for the graphics data with the bit budget, and
if the number of bits for the graphics data is less than or equal to the bit budget, storing, in memory, the graphics data; and
if the number of bits for the graphics data is greater than the bit budget, removing bits from the graphics data until the graphics data is less than or equal to the bit budget to generate reduced graphics data and subsequently storing in memory the reduced graphics data, wherein removing bits from the graphics data comprises, iteratively, in an order of the plurality of color channels:
reducing an individual one of the one or more bit widths by one or more bits;
re-setting an individual one of the one or more index bit widths to the reduced one or more bit widths;
re-quantizing an individual one the one or more boundary ranges to generate one or more reduced sets of available values;
re-associating an individual one the one or more reduced sets of available values with one or more reduced sets of index values;
re-encoding an individual set of the sub-values corresponding to the one or more of the plurality of color channels by re-associating each of the sub-values with a reduced encoded index value from the corresponding set of reduced index values to generate reduced encoded index values;
re-determining a reduced number of bits for the reduced graphics data;
re-comparing the reduced number of bits for the graphics data with the bit budget, and
if the reduced number of bits for the graphics data is less than or equal to the bit budget, storing, in memory, the reduced graphics data; and
if the number of bits for the reduced graphics data is greater than the bit budget, performing another iteration so long as the individual one of the one or more bit widths is greater than a minimum threshold bit width, wherein the color values comprise pseudo luminance/intensity orange chrominance green chrominance alpha (YCoCgA) color values, and wherein the order comprises A, Cg, Co, Y;
rendering the plurality of pixels;
accessing the graphics data, wherein accessing the graphics data comprises reading the graphics data from the memory;
determining, based at least in part on the data associated with the bounding box and the one or more bit widths, the one or more sets of available values;
determining, based at least in part on the encoded index values, a plurality of decoded color values for the plurality of pixels, wherein the decoded color values are lossy with respect to the plurality of color values; and
mapping the plurality of decoded color values from a third color space to a fourth color space, wherein the third color space comprises the pseudo luminance/intensity orange chrominance green chrominance alpha (YCoCgA) color space, and wherein the fourth color space comprises the red green blue alpha (RGBA) color space,
wherein the plurality of color values comprise at least one of red green blue alpha (RGBA) color values or pseudo luminance/intensity orange chrominance green chrominance alpha (YCoCgA) color values,
wherein the bounding box comprises at least one of one bounding range, two bounding ranges, three bounding ranges, or four bounding ranges,
wherein determining the plurality of color values comprises mapping from a first color space to a second color space, wherein the second color space is associated with the plurality of color channels, wherein the first color space comprises a red green blue alpha (RGBA) color space, and wherein the second color space comprises a pseudo luminance/intensity orange chrominance green chrominance alpha (YCoCgA) color space,
wherein the plurality of pixels comprise a tile of pixels, and wherein the tile of pixels comprises an 8 pixels wide by 4 pixels high tile of pixels,
wherein the bounding box comprises a bounding range for each of the plurality of color channels, and
wherein a first bit width of the one or more bit widths comprises at least one of 0, 1, 2, 4, 8, 16, or 32 bits, wherein a second bit width of the one or more bit widths comprises 0 bits and wherein, for a corresponding second color channel of the plurality of color channels, the encoded index values comprise no data.

12. A system to provide compression in graphics rendering on a computer, comprising:
a graphics buffer;
a graphics processing unit comprising a graphics data codec module, wherein the graphics processing unit is communicatively coupled to the graphics buffer and wherein the graphics data codec module is configured to:
determine a plurality of color values associated with a plurality of pixels, wherein the plurality of color values comprise sub-values corresponding to a plurality of color channels;
determine a bounding box for the sub-values, wherein the bounding box comprises one or more bounding ranges for one or more of the plurality of color channels;
set one or more bit widths corresponding to the one or more bounding ranges;
set one or more index bit widths for the one or more sets of index values to the one or more bit widths;
quantize the one or more bounding ranges to generate one or more sets of available values, the one or more bit widths comprising a number of bits for representing the corresponding one or more available values;
associate the one or more sets of available values with one or more sets of index values;
encode the sub-values corresponding to one or more of the plurality of color channels by associating the sub-values with an encoded index value from a corresponding set of index values of the one or more index values to generate encoded index values; and
store in the graphics buffer, graphics data comprising the encoded index values and data associated with the bounding box.

13. The system of claim 12, further comprising:
a display device configured to display output image data based at least in part on the graphics data.

14. The system of claim 12, wherein the plurality of color values comprise at least one of red green blue alpha (RGBA) color values or pseudo luminance/intensity orange chrominance green chrominance alpha (YCoCgA) color values.

15. The system of claim 12, wherein the graphics data codec module is further configured to:

access the graphics data, wherein accessing the graphics data comprises reading the graphics data from the graphics buffer;

determine, based at least in part on the data associated with the bounding box and the one or more bit widths, the one or more sets of available values;

determine, based at least in part on the encoded index values, a plurality of decoded color values for the plurality of pixels, wherein the decoded color values are lossy with respect to the plurality of color values; and map the plurality of decoded color values from a third color space to a fourth color space, wherein the third color space comprises the pseudo luminance/intensity orange chrominance green chrominance alpha (YCoCgA) color space, and wherein the fourth color space comprises the red green blue alpha (RGBA) color space.

16. The system of claim 12, wherein determination of the plurality of color values comprises mapping from a red green blue alpha (RGBA) color space to a pseudo luminance/intensity orange chrominance green chrominance alpha (YCoCgA) color space.

17. The system of claim 12, wherein the graphics data codec module is further configured to:
determine a number of bits for the graphics data, wherein the graphic data comprises data associated with the plurality of bounding ranges, wherein the data associated with the plurality of bounding ranges comprises a minimum value and a maximum value for each of the plurality of bounding ranges, wherein the graphics data further comprises the one or more bit widths;
determine a bit budget;
compare the number of bits for the graphics data with the bit budget, and
if the number of bits for the graphics data is less than or equal to the bit budget, store, in the graphics buffer, the graphics data; and
if the number of bits for the graphics data is greater than the bit budget, remove bits from the graphics data until the graphics data is less than or equal to the bit budget to generate reduced graphics data and subsequently storing in memory the reduced graphics data, wherein to remove bits from the graphics data the graphics data codec module is configured to, iteratively, in an order of the plurality of color channels:
reduce an individual one of the one or more bit widths by one or more bits;
re-set an individual one of the one or more index bit widths to the reduced one or more bit widths;
re-quantize an individual one the one or more boundary ranges to generate one or more reduced sets of available values;
re-associate an individual one the one or more reduced sets of available values with one or more reduced sets of index values;
re-encode an individual set of the sub-values corresponding to the one or more of the plurality of color channels by re-associating each of the sub-values with a reduced encoded index value from the corresponding set of reduced index values to generate reduced encoded index values;
re-determine a reduced number of bits for the reduced graphics data;
re-compare the reduced number of bits for the graphics data with the bit budget, and
if the reduced number of bits for the graphics data is less than or equal to the bit budget, store, in the graphics buffer, the reduced graphics data; and
if the number of bits for the reduced graphics data is greater than the bit budget, perform another iteration so long as the individual one of the one or more bit widths is greater than a minimum threshold bit width.

18. The system of claim 12, further comprising:
a display device configured to display output image data based at least in part on the graphics data,
wherein the graphics data codec module is further configured to:
determine a number of bits for the graphics data, wherein the graphic data comprises data associated with the plurality of bounding ranges, wherein the data associated with the plurality of bounding ranges comprises a minimum value and a maximum value for each of the plurality of bounding ranges, wherein the graphics data further comprises the one or more bit widths, and wherein the graphics data further comprises a clearmask enabled indicator bit and clearmask bits;
determine a bit budget;
compare the number of bits for the graphics data with the bit budget, and
if the number of bits for the graphics data is less than or equal to the bit budget, store, in the graphics buffer, the graphics data; and
if the number of bits for the graphics data is greater than the bit budget, remove bits from the graphics data until the graphics data is less than or equal to the bit budget to generate reduced graphics data and subsequently storing in memory the reduced graphics data, wherein to remove bits from the graphics data the graphics data codec module is configured to, iteratively, in an order of the plurality of color channels:
reduce an individual one of the one or more bit widths by one or more bits;
re-set an individual one of the one or more index bit widths to the reduced one or more bit widths;
re-quantize an individual one the one or more boundary ranges to generate one or more reduced sets of available values;
re-associate an individual one the one or more reduced sets of available values with one or more reduced sets of index values;
re-encode an individual set of the sub-values corresponding to the one or more of the plurality of color channels by re-associating each of the sub-values with a reduced encoded index value from the corresponding set of reduced index values to generate reduced encoded index values;
re-determine a reduced number of bits for the reduced graphics data;
re-compare the reduced number of bits for the graphics data with the bit budget, and
if the reduced number of bits for the graphics data is less than or equal to the bit budget, store, in the graphics buffer, the reduced graphics data; and
if the number of bits for the reduced graphics data is greater than the bit budget, perform another iteration so long as the individual one of the one or more bit widths is greater than a minimum threshold bit width, wherein the color values comprise pseudo luminance/intensity orange chrominance green chrominance alpha (YCoCgA) color values, and wherein the order comprises A, Cg, Co, Y;
render the plurality of pixels;

access the graphics data, wherein accessing the graphics data comprises reading the graphics data from the graphics buffer;

determine, based at least in part on the data associated with the bounding box and the one or more bit widths, the one or more sets of available values;

determine, based at least in part on the encoded index values, a plurality of decoded color values for the plurality of pixels, wherein the decoded color values are lossy with respect to the plurality of color values; and map the plurality of decoded color values from a third color space to a fourth color space, wherein the third color space comprises the pseudo luminance/intensity orange chrominance green chrominance alpha (YCoCgA) color space, and wherein the fourth color space comprises the red green blue alpha (RGBA) color space, wherein the plurality of color values comprise at least one of red green blue alpha (RGBA) color values or pseudo luminance/intensity orange chrominance green chrominance alpha (YCoCgA) color values, wherein the bounding box comprises at least one of one bounding range, two bounding ranges, three bounding ranges, or four bounding ranges, wherein determination of the plurality of color values comprises mapping from a first color space to a second color space, wherein the second color space is associated with the plurality of color channels, wherein the first color space comprises a red green blue alpha (RGBA) color space, and wherein the second color space comprises a pseudo luminance/intensity orange chrominance green chrominance alpha (YCoCgA) color space, wherein the plurality of pixels comprise a tile of pixels, and wherein the tile of pixels comprises an 8 pixels wide by 4 pixels high tile of pixels, wherein the bounding box comprises a bounding range for each of the plurality of color channels, and wherein a first bit width of the one or more bit widths comprises at least one of 0, 1, 2, 4, 8, 16, or 32 bits, wherein a second bit width of the one or more bit widths comprises 0 bits and wherein, for a corresponding second color channel of the plurality of color channels, the encoded index values comprise no data.

19. At least one non-transitory machine readable medium comprising a plurality of instructions that in response to being executed on a computing device, cause the computing device to provide compression in graphics rendering by:

determining a plurality of color values associated with a plurality of pixels, wherein the plurality of color values comprise sub-values corresponding to a plurality of color channels;

determining a bounding box for the sub-values, wherein the bounding box comprises one or more bounding ranges for one or more of the plurality of color channels;

setting one or more bit widths corresponding to the one or more bounding ranges;

setting one or more index bit widths for the one or more sets of index values to the one or more bit widths;

quantizing the one or more bounding ranges to generate one or more sets of available values, the one or more bit widths comprising a number of bits for representing the corresponding one or more available values;

associating the one or more sets of available values with one or more sets of index values;

encoding sub-values corresponding to one or more of the plurality of color channels by associating the sub-values with an encoded index value from the corresponding set of index values to generate encoded index values; and storing, in memory, graphics data comprising the encoded index values and data associated with the bounding box.

20. The non-transitory machine readable medium of claim 19, further comprising instructions that in response to being executed on the computing device, cause the computing device to provide compression in graphics rendering by:

determining a number of bits for the graphics data, wherein the graphic data comprises data associated with the plurality of bounding ranges, wherein the data associated with the plurality of bounding ranges comprises a minimum value and a maximum value for each of the plurality of bounding ranges, wherein the graphics data further comprises the one or more bit widths;

determining a bit budget;

comparing the number of bits for the graphics data with the bit budget, and if the number of bits for the graphics data is less than or equal to the bit budget, storing, in memory, the graphics data; and if the number of bits for the graphics data is greater than the bit budget, removing bits from the graphics data until the graphics data is less than or equal to the bit budget to generate reduced graphics data and subsequently storing in memory the reduced graphics data.

21. The non-transitory machine readable medium of claim 19, further comprising instructions that in response to being executed on the computing device, cause the computing device to provide compression in graphics rendering by:

accessing the graphics data, wherein accessing the graphics data comprises reading the graphics data from the memory;

determining, based at least in part on the data associated with the bounding box and the one or more bit widths, the one or more sets of available values;

determining, based at least in part on the encoded index values, a plurality of decoded color values for the plurality of pixels, wherein the decoded color values are lossy with respect to the plurality of color values.

22. The non-transitory machine readable medium of claim 19, further comprising instructions that in response to being executed on the computing device, cause the computing device to provide compression in graphics rendering by:

determining a number of bits for the graphics data, wherein the graphic data comprises data associated with the plurality of bounding ranges, wherein the data associated with the plurality of bounding ranges comprises a minimum value and a maximum value for each of the plurality of bounding ranges, wherein the graphics data further comprises the one or more bit widths, and wherein the graphics data further comprises a clearmask enabled indicator bit and clearmask bits;

determining a bit budget;

comparing the number of bits for the graphics data with the bit budget, and if the number of bits for the graphics data is less than or equal to the bit budget, storing, in memory, the graphics data; and if the number of bits for the graphics data is greater than the bit budget, removing bits from the graphics data until the graphics data is less than or equal to the bit budget to generate reduced graphics data and subsequently storing in memory the reduced graphics data, wherein removing bits from the graphics data comprises, iteratively, in an order of the plurality of color channels:
reducing an individual one of the one or more bit widths by one or more bits;
re-setting an individual one of the one or more index bit widths to the reduced one or more bit widths;
re-quantizing an individual one the one or more boundary ranges to generate one or more reduced sets of available values;
re-associating an individual one the one or more reduced sets of available values with one or more reduced sets of index values;
re-encoding an individual set of the sub-values corresponding to the one or more of the plurality of color channels by re-associating each of the sub-values with a reduced encoded index value from the corresponding set of reduced index values to generate reduced encoded index values;
re-determining a reduced number of bits for the reduced graphics data;
re-comparing the reduced number of bits for the graphics data with the bit budget, and
if the reduced number of bits for the graphics data is less than or equal to the bit budget, storing, in memory, the reduced graphics data; and
if the number of bits for the reduced graphics data is greater than the bit budget, performing another iteration so long as the individual one of the one or more bit widths is greater than a minimum threshold bit width, wherein the color values comprise pseudo luminance/intensity orange chrominance green chrominance alpha (YCoCgA) color values, and wherein the order comprises A, Cg, Co, Y;
rendering the plurality of pixels;
accessing the graphics data, wherein accessing the graphics data comprises reading the graphics data from the memory;
determining, based at least in part on the data associated with the bounding box and the one or more bit widths, the one or more sets of available values;
determining, based at least in part on the encoded index values, a plurality of decoded color values for the plurality of pixels, wherein the decoded color values are lossy with respect to the plurality of color values; and
mapping the plurality of decoded color values from a third color space to a fourth color space, wherein the third color space comprises the pseudo luminance/intensity orange chrominance green chrominance alpha (YCoCgA) color space, and wherein the fourth color space comprises the red green blue alpha (RGBA) color space,
wherein the plurality of color values comprise at least one of red green blue alpha (RGBA) color values or pseudo luminance/intensity orange chrominance green chrominance alpha (YCoCgA) color values,
wherein the bounding box comprises at least one of one bounding range, two bounding ranges, three bounding ranges, or four bounding ranges,
wherein determining the plurality of color values comprises mapping from a first color space to a second color space, wherein the second color space is associated with the plurality of color channels, wherein the first color space comprises a red green blue alpha (RGBA) color space, and wherein the second color space comprises a pseudo luminance/intensity orange chrominance green chrominance alpha (YCoCgA) color space,
wherein the plurality of pixels comprise a tile of pixels, and wherein the tile of pixels comprises an 8 pixels wide by 4 pixels high tile of pixels,
wherein the bounding box comprises a bounding range for each of the plurality of color channels, and
wherein a first bit width of the one or more bit widths comprises at least one of 0, 1, 2, 4, 8, 16, or 32 bits, wherein a second bit width of the one or more bit widths comprises 0 bits and wherein, for a corresponding second color channel of the plurality of color channels, the encoded index values comprise no data.

* * * * *